(12) United States Patent
Skakkebaek et al.

(10) Patent No.: US 8,064,576 B2
(45) Date of Patent: Nov. 22, 2011

(54) VOICEMAIL FILTERING AND TRANSCRIPTION

(75) Inventors: Jens Ulrik Skakkebaek, San Carlos, CA (US); Cary W. FitzGerald, Palo Alto, CA (US)

(73) Assignee: Avaya Inc., Basking Ridge, NJ (US)

( * ) Notice: Subject to any disclaimer, the term of this patent is extended or adjusted under 35 U.S.C. 154(b) by 1240 days.

(21) Appl. No.: 11/709,475

(22) Filed: Feb. 21, 2007

(65) Prior Publication Data

US 2008/0198979 A1    Aug. 21, 2008

(51) Int. Cl.
*H04M 11/00* (2006.01)
*H04W 4/00* (2009.01)

(52) U.S. Cl. ..................... 379/88.13; 455/466

(58) Field of Classification Search .............. 379/88.13; 455/466; 704/260
See application file for complete search history.

(56) References Cited

U.S. PATENT DOCUMENTS

| | | | |
|---|---|---|---|
| 1,113,631 A * | 10/1914 | Hoffman | 526/200 |
| 5,029,199 A | 7/1991 | Jones et al. | |
| 5,345,501 A | 9/1994 | Shelton | |
| 5,568,540 A | 10/1996 | Greco et al. | |
| 5,572,578 A | 11/1996 | Lin et al. | |
| 5,647,002 A | 7/1997 | Brunson | |
| 5,703,942 A | 12/1997 | Pinard et al. | |
| 5,712,901 A | 1/1998 | Meermans | |
| 5,717,742 A | 2/1998 | Hyde-Thomson | |
| 5,742,668 A | 4/1998 | Pepe et al. | |
| 5,778,390 A | 7/1998 | Nelson et al. | |
| 5,845,203 A | 12/1998 | LaDue | |
| 5,903,627 A | 5/1999 | Shaffer et al. | |
| 5,909,483 A | 6/1999 | Weare et al. | |
| 5,915,001 A | 6/1999 | Uppaluru | |
| 5,946,386 A | 8/1999 | Rogers et al. | |
| 5,995,596 A | 11/1999 | Shaffer et al. | |
| 6,021,181 A | 2/2000 | Miner et al. | |
| 6,047,053 A | 4/2000 | Miner et al. | |

(Continued)

FOREIGN PATENT DOCUMENTS

CN     1836431     9/2006

(Continued)

OTHER PUBLICATIONS

Notice of Allowance for U.S. Appl. No. 11/053,425, mailed Jan. 4, 2010.

(Continued)

*Primary Examiner* — Davetta W Goins
*Assistant Examiner* — Mohammad Islam
(74) *Attorney, Agent, or Firm* — Sheridan Ross P.C.

(57) ABSTRACT

Systems and methods for voicemail filtering and transcription are described herein. According to various embodiments, an integrated communication system performs filtering and transcription of voicemail messages ("voicemails") and forwards the voicemails via email to a user's email-capable device. Filtering includes generating a priority flag based on a word search of the voicemail. The integrated communication system further performs a rough transcription of the voicemail, either automatically or on demand as specified by the user. According to embodiments, the rough transcription is entered as text in an email that is sent to the user. In an embodiment, a user may request a refined transcription of the voicemail by pressing a button on the user's device. In an embodiment, the rough transcription is replaced by the refined transcription in the original email and the original is marked "unread" in the user's email inbox on the user's device.

26 Claims, 14 Drawing Sheets

U.S. PATENT DOCUMENTS

| | | |
|---|---|---|
| 6,052,709 A | 4/2000 | Paul |
| 6,070,081 A | 5/2000 | Takahashi et al. |
| 6,072,862 A | 6/2000 | Srinivasan |
| 6,076,090 A | 6/2000 | Burroughs et al. |
| 6,085,231 A | 7/2000 | Agraharam et al. |
| 6,138,209 A | 10/2000 | Krolak et al. |
| 6,163,794 A | 12/2000 | Lange et al. |
| 6,181,780 B1 | 1/2001 | Finnigan |
| 6,212,265 B1 * | 4/2001 | Duphorne ................ 379/142.15 |
| 6,233,318 B1 | 5/2001 | Picard et al. |
| 6,253,206 B1 | 6/2001 | Burton et al. |
| 6,275,570 B1 | 8/2001 | Homan et al. |
| 6,304,636 B1 | 10/2001 | Goldberg et al. |
| 6,317,484 B1 | 11/2001 | McAllister |
| 6,317,485 B1 | 11/2001 | Homan et al. |
| 6,324,265 B1 | 11/2001 | Christie, IV et al. |
| 6,339,776 B2 | 1/2002 | Dayani-Fard et al. |
| 6,351,523 B1 | 2/2002 | Detlef |
| 6,389,115 B1 | 5/2002 | Swistock |
| 6,389,276 B1 | 5/2002 | Brilla et al. |
| 6,396,907 B1 | 5/2002 | Didcock |
| 6,396,908 B1 | 5/2002 | O'Donovan et al. |
| 6,405,035 B1 | 6/2002 | Singh |
| 6,411,685 B1 | 6/2002 | O'Neal |
| 6,434,222 B1 | 8/2002 | Shaffer et al. |
| 6,438,215 B1 | 8/2002 | Skladman et al. |
| 6,493,431 B1 | 12/2002 | Troen-Krasnow et al. |
| 6,501,750 B1 | 12/2002 | Shaffer et al. |
| 6,519,327 B1 | 2/2003 | Cannon et al. |
| 6,519,571 B1 | 2/2003 | Guheen et al. |
| 6,524,274 B1 | 2/2003 | Rosenthal et al. |
| 6,526,274 B1 | 2/2003 | Fickes et al. |
| 6,549,612 B2 | 4/2003 | Gifford et al. |
| 6,553,563 B2 | 4/2003 | Ambrose et al. |
| 6,587,871 B1 | 7/2003 | Schrader |
| 6,618,763 B1 | 9/2003 | Steinberg |
| 6,629,138 B1 | 9/2003 | Lambert et al. |
| 6,671,800 B1 | 12/2003 | McInally et al. |
| 6,683,940 B2 | 1/2004 | Contractor |
| 6,714,778 B2 | 3/2004 | Nykanen et al. |
| 6,721,398 B1 | 4/2004 | Pitcher |
| 6,725,205 B1 | 4/2004 | Weiler et al. |
| 6,731,927 B1 | 5/2004 | Stern et al. |
| 6,785,367 B2 * | 8/2004 | Horvath et al. ............ 379/88.04 |
| 6,832,373 B2 | 12/2004 | O'Neill |
| 6,853,714 B2 | 2/2005 | Liljestrand et al. |
| 6,868,143 B1 | 3/2005 | Menon et al. |
| 6,871,346 B1 | 3/2005 | Kumbalimutt et al. |
| 6,937,724 B1 | 8/2005 | Kozdon et al. |
| 6,947,989 B2 | 9/2005 | Gullotta et al. |
| 6,950,502 B1 | 9/2005 | Jenkins |
| 6,950,990 B2 | 9/2005 | Rajarajan et al. |
| 6,952,558 B2 | 10/2005 | Hardacker |
| 6,957,186 B1 | 10/2005 | Guheen et al. |
| 6,996,413 B2 | 2/2006 | Inselberg |
| 7,068,668 B2 | 6/2006 | Feuer |
| 7,072,934 B2 | 7/2006 | Helgeson et al. |
| 7,082,469 B2 | 7/2006 | Gold et al. |
| 7,092,504 B1 | 8/2006 | Buller |
| 7,136,461 B1 | 11/2006 | Swingle et al. |
| 7,136,865 B1 | 11/2006 | Ra et al. |
| 7,151,823 B2 | 12/2006 | Durkin |
| 7,167,550 B2 | 1/2007 | Klos et al. |
| 7,203,288 B1 | 4/2007 | Dwyer et al. |
| 7,222,156 B2 | 5/2007 | Gupta et al. |
| 7,281,269 B1 | 10/2007 | Sievers et al. |
| 7,317,788 B2 * | 1/2008 | Caspi et al. ................ 379/88.13 |
| 7,321,655 B2 | 1/2008 | Skakkebaek et al. |
| 7,330,537 B2 | 2/2008 | Frifeldt et al. |
| 7,346,150 B2 | 3/2008 | Frifeldt et al. |
| 7,373,607 B2 | 5/2008 | Daniell |
| 7,379,540 B1 | 5/2008 | Van Gundy |
| 7,519,984 B2 | 4/2009 | Bhogal et al. |
| 7,564,954 B2 | 7/2009 | Frifeldt et al. |
| 7,680,820 B2 | 3/2010 | Denoue et al. |
| 7,693,267 B2 | 4/2010 | Howell et al. |
| 2002/0032752 A1 | 3/2002 | Gold et al. |
| 2002/0049749 A1 | 4/2002 | Helgeson et al. |
| 2002/0064149 A1 | 5/2002 | Elliott et al. |
| 2002/0115454 A1 | 8/2002 | Hardacker |
| 2002/0123331 A1 | 9/2002 | Lehaff et al. |
| 2002/0123342 A1 | 9/2002 | Lehaff et al. |
| 2002/0131573 A1 | 9/2002 | Berkley et al. |
| 2002/0143877 A1 | 10/2002 | Hackbarth et al. |
| 2002/0147801 A1 | 10/2002 | Gullotta et al. |
| 2002/0165986 A1 | 11/2002 | Tarnoff |
| 2002/0169876 A1 | 11/2002 | Curie et al. |
| 2002/0188453 A1 | 12/2002 | Hirschberg et al. |
| 2003/0028603 A1 | 2/2003 | Aktas et al. |
| 2003/0046421 A1 | 3/2003 | Horvitz et al. |
| 2003/0050046 A1 | 3/2003 | Conneely et al. |
| 2003/0128820 A1 | 7/2003 | Hirschberg et al. |
| 2003/0140112 A1 | 7/2003 | Ramachandran et al. |
| 2003/0195934 A1 | 10/2003 | Peterson et al. |
| 2003/0220784 A1 | 11/2003 | Fellenstein et al. |
| 2003/0220975 A1 | 11/2003 | Malik |
| 2004/0002325 A1 | 1/2004 | Evans et al. |
| 2004/0019644 A1 | 1/2004 | Fellenstein et al. |
| 2004/0022379 A1 | 2/2004 | Klos et al. |
| 2004/0039786 A1 | 2/2004 | Horvitz et al. |
| 2004/0044687 A1 | 3/2004 | Vachuska et al. |
| 2004/0044989 A1 | 3/2004 | Vachuska et al. |
| 2004/0049696 A1 | 3/2004 | Baker et al. |
| 2004/0062368 A1 | 4/2004 | Durkin |
| 2004/0064502 A1 | 4/2004 | Yellepeddy et al. |
| 2004/0109544 A1 | 6/2004 | Didcock et al. |
| 2004/0111702 A1 | 6/2004 | Chan |
| 2004/0120480 A1 | 6/2004 | Didcock et al. |
| 2004/0121761 A1 | 6/2004 | Tripathy et al. |
| 2004/0146144 A1 | 7/2004 | Gao et al. |
| 2004/0171381 A1 | 9/2004 | Inselberg |
| 2004/0186861 A1 | 9/2004 | Phatak |
| 2004/0199587 A1 | 10/2004 | McKnight |
| 2004/0225525 A1 | 11/2004 | Weitzman |
| 2004/0253956 A1 | 12/2004 | Collins |
| 2004/0258231 A1 | 12/2004 | Elsey et al. |
| 2004/0267768 A1 | 12/2004 | Harjanto |
| 2005/0013419 A1 | 1/2005 | Pelaez et al. |
| 2005/0018821 A1 * | 1/2005 | Darsin et al. ................ 379/88.13 |
| 2005/0025297 A1 | 2/2005 | Finnigan |
| 2005/0091226 A1 | 4/2005 | Lin et al. |
| 2005/0132266 A1 | 6/2005 | Ambrosino et al. |
| 2005/0163289 A1 * | 7/2005 | Caspi et al. ................ 379/88.13 |
| 2005/0216421 A1 | 9/2005 | Barry et al. |
| 2006/0031340 A1 * | 2/2006 | Mathew et al. ................ 709/206 |
| 2006/0059107 A1 | 3/2006 | Elmore et al. |
| 2006/0072720 A1 | 4/2006 | Blohm |
| 2006/0177005 A1 | 8/2006 | Shaffer et al. |
| 2006/0177007 A1 | 8/2006 | Vaghar et al. |
| 2006/0177008 A1 | 8/2006 | Forney et al. |
| 2006/0177009 A1 | 8/2006 | Skakkebaek et al. |
| 2006/0177011 A1 | 8/2006 | Skakkebaek et al. |
| 2006/0177012 A1 | 8/2006 | Forney et al. |
| 2006/0177014 A1 | 8/2006 | Skakkebaek et al. |
| 2006/0177015 A1 | 8/2006 | Skakkebaek et al. |
| 2006/0177023 A1 | 8/2006 | Vaghar et al. |
| 2006/0177024 A1 | 8/2006 | Frifeldt et al. |
| 2006/0223502 A1 | 10/2006 | Doulton |
| 2006/0234680 A1 | 10/2006 | Doulton |
| 2006/0274856 A1 | 12/2006 | Dunn et al. |
| 2007/0005713 A1 * | 1/2007 | LeVasseur et al. ............ 709/206 |
| 2007/0174388 A1 | 7/2007 | Williams |
| 2008/0133548 A1 | 6/2008 | Skakkebaek et al. |
| 2008/0175235 A1 | 7/2008 | Frifeldt et al. |
| 2008/0198979 A1 * | 8/2008 | Skakkebaek et al. ...... 379/88.13 |
| 2008/0198980 A1 | 8/2008 | Skakkebaek et al. |
| 2008/0198981 A1 | 8/2008 | Skakkebaek et al. |
| 2008/0279350 A1 | 11/2008 | Skakkebaek et al. |
| 2010/0184409 A1 | 7/2010 | Doulton |

FOREIGN PATENT DOCUMENTS

| | | |
|---|---|---|
| DE | 10338237 | 3/2005 |
| WO | WO 2006/086335 A2 | 8/2006 |
| WO | WO 2006/086335 A3 | 8/2006 |

OTHER PUBLICATIONS

Extended European Search Report for European Patent Application No. 08705860.8, dated Nov. 24, 2010.
Official Action for U.S. Appl. No. 11/053,054, mailed Dec. 29, 2010.
U.S. Appl. No. 13/022,770, filed Feb. 8, 2011, Skakkebaek et al.
Official Action for U.S. Appl. No. 11/053,411, mailed Mar. 16, 2010.
Official Action for U.S. Appl. No. 12/016,350, mailed Dec. 29, 2009.
Notice of Allowability for U.S. Appl. No. 11/053,271, mailed Jun. 3, 2010.
Official Action for U.S. Appl. No. 12/016,350, mailed Mar. 24, 2010.
Official Action for U.S. Appl. No. 12/016,365, mailed Mar. 29, 2010.
Official Action for U.S. Appl. No. 11/053,147, mailed Jun. 25, 2010.
Official Action for U.S. Appl. No. 12/016,350, mailed Jun. 30, 2010.
Official Action for U.S. Appl. No. 11/0053,054, mailed Jun. 7, 2010.
"Introducing Adomo MCS Voice Access to Microsoft Outlook/Exchange," Adomo, Inc., http://support.adomo.com/3.1/user/, for Sep. 2003 release.
"Administrator's Guide", Adomo, Inc., http://support.adomo.com/3.1/adminguide/, for Sep. 2003 release.
AdomoMCS, Mobile Communication Server™, Adomo Inc., undated, 2 pages.
CMP Media LLC, "Adomo Launches Mobile Communications Server," Computer Telephony, Apr. 2001.
International Search Report for International (PCT) Application No. PCT/US08/50835, mailed Mar. 31, 2008.
Written Opinion for International (PCT) Application No. PCT/US08/50835, mailed Mar. 31, 2008.
International Preliminary Report on Patentability for International (PCT) Application No. PCT/US08/50835, issued Aug. 26, 2009.
International Preliminary Report on Patentability for International (PCT) Application No. PCT/US2008/050840, mailed Apr. 15, 2008.
Written Opinion for International (PCT) Application No. PCT/US2008/050840, mailed Apr. 15, 2008.
International Preliminary Report on Patentability for International (PCT) Application No. PCT/US2008/050840, Issued Aug. 26, 2009.
International Search Report for International (PCT) Application No. PCT/US2008/050842, mailed Apr. 30, 2008.
Written Opinion for International (PCT) Application No. PCT/US2008/050842, mailed Apr. 30, 2008.
International Preliminary Report on Patentability for International (PCT) Application No. PCT/US2008/050842, issued Aug. 26, 2009.
Official Action for U.S. Appl. No. 11/053,376, mailed Jul. 19, 2006.
Official Action for U.S. Appl. No. 11/053,376, mailed Apr. 5, 2007.
Official Action for U.S. Appl. No. 11/053,376, mailed Nov. 16, 2007.
Official Action for U.S. Appl. No. 11/053,376, mailed Sep. 5, 2008.
Official Action for U.S. Appl. No. 11/053,539, mailed Aug. 11, 2006.
Official Action for U.S. Appl. No. 11/053,539, mailed May 14, 2007.
Official Action for U.S. Appl. No. 11/053,538, mailed Jul. 6, 2006.
Official Action for U.S. Appl. No. 11/053,538, mailed Mar. 22, 2007.
Official Action for U.S. Appl. No. 11/053,538, mailed Nov. 27, 2007.
Official Action for U.S. Appl. No. 11/053,736, mailed Aug. 19, 2008.
Official Action for U.S. Appl. No. 11/053,271, mailed Apr. 3, 2008.
Official Action for U.S. Appl. No. 11/053,271, mailed Jan. 7, 2009.
Official Action for U.S. Appl. No. 11/053,147, mailed Apr. 3, 2009.
Official Action for U.S. Appl. No. 11/053,411, mailed Apr. 23, 2008.
Official Action for U.S. Appl. No. 11/053,411, mailed Dec. 31, 2008.
Official Action for U.S. Appl. No. 12/016,350, mailed Apr. 29, 2009.
Official Action for U.S. Appl. No. 12/016,365, mailed Nov. 10, 2008.
Official Action for U.S. Appl. No. 11/053,054, mailed Jun. 28, 2006.
Official Action for U.S. Appl. No. 11/053,054, mailed Nov. 15, 2007.
Official Action for U.S. Appl. No. 11/053,054, mailed Jun. 3, 2008.
Official Action for U.S. Appl. No. 11/053,054, mailed May 26, 2009.
Official Action for U.S. Appl. No. 11/053,425, mailed Jul. 10, 2008.
Official Action for U.S. Appl. No. 11/053,425, mailed Apr. 13, 2009.
Official Action for U.S. Appl. No. 11/053,270, mailed Apr. 3, 2009.
Official Action for U.S. Appl. No. 11/053,054, mailed Mar. 21, 2007.
Official Action for U.S. Appl. No. 11/053,411, mailed Sep. 20, 2010.
Notice of Allowability for U.S. Appl. No. 12/016,350, mailed Nov. 9, 2010.
Notice of Allowability for U.S. Appl. No. 12/016,365, mailed Sep. 16, 2010.
Official Action for U.S. Appl. No. 11/053,271, mailed Dec. 1, 2009.
Official Action for U.S. Appl. No. 11/053,147, mailed Dec. 9, 2009.
Official Action for U.S. Appl. No. 11/053,411, mailed Sep. 30, 2009.
Final Official Action for U.S. Appl. No. 12/016,365, mailed Oct. 13, 2009.
Official Action for U.S. Appl. No. 11/053,270, mailed Dec. 11, 2009.
Official Action for U.S. Appl. No. 11/709,513, mailed Jun. 13, 2011.
Official Action (including translation) for Chinese Patent Application No. 200880012085.8, dated Jun. 21, 2011.
Extended European Search Report for European Patent Application No. 08705866.5, dated Jun. 20, 2011.
Extended European Search Report for European Patent Application No. 08705865.7, dated Jun. 20, 2011.
Official Action for U.S. Appl. No. 11/709,542, mailed Jun. 23, 2011.

* cited by examiner

# VOICEMAIL FILTERING AND TRANSCRIPTION

CROSS-REFERENCE

This application is related to the following U.S. patent applications:

Voicemail Filtering and Transcription, U.S. application Ser. No. 11/709,542, invented by Jens Ulrik Skakkebaek and Cary W. FitzGerald, filed concurrently herewith; and Voicemail Filtering and Transcription, U.S. application Ser. No. 11/709,513, invented by Jens Ulrik Skakkebaek and Cary W. FitzGerald, filed concurrently herewith.

TECHNICAL FIELD

The disclosure herein relates generally to integrated communication and messaging systems, and more particularly to voicemail transcription in such systems.

BACKGROUND

Almost everyone today communicates using more than one communication technology or medium multiple times per day. Communication media include electronic mail ("email") messaging, Short Messaging Service ("SMS") messaging, voice messaging, and more. Users receive and send messages over a variety of wired and wireless networks via a variety of devices, such as desktop computers, wired phones, wireless devices (e.g., phones and personal digital assistants ("PDAs")), and more.

Currently it is possible to receive emails on a mobile phone device, such as a BlackBerry®. It is also possible to receive notification of voicemails via email on any email capable device. In some systems, email notification includes a playable audio file (such as a WAV file, for example) of the message so the user may hear the message without calling in to a voicemail system. This voicemail/email integration is available to individual users through commercial providers who may redirect voice callers from the users "old" phone number to their system. Alternatively, some providers give the user a different number to be used for voicemail-to-email processing. In addition, complete integration of communication media within an enterprise is available from Adomo, Inc. For example, the Adomo "Unified Communications" solutions integrate tightly with existing enterprise communications and data management systems to provide employees with seamless access to messages of all types on all devices, no matter where the employee are physically located.

As capable devices and systems proliferate, users increasingly demand that their messages be readily, if not instantly, available on all of their devices, regardless of the type or source of the message. At the same time, the ubiquity of highly capable communication devices just seems to raise message recipients' expectations that their messages will be very promptly received, understood, and appropriately responded to. Even though users have more and faster access than ever to voicemail and email, there are still some areas in which the time for apprehending and/or responding to messages can be relatively slow. For example, a user may receive an email notification that a voicemail has been received, but may be unable to access and/or listen to the voicemail right away. If the user is in a meeting it may be acceptable to glance at his or her device to see what kind of message has been received, but it is not acceptable to listen to a voicemail. In some cases, the identity of the voicemail sender may be known from the notification, which might provide some level of information regarding the urgency of the message. In many cases, there is no information other than the notification itself.

To eliminate the inconvenience and delay caused by having to listen to voicemails, methods have been developed to provide voicemail transcriptions to a user's device (such as a BlackBerry®, for example) instead of an audio data file or a link to an audio data file. For example, Spinvox® Ltd. offers a voicemail transcription service that requires a mobile network provider to install particular voicemail software. Voicemail data is sent by the network provider to a transcriber who plays and transcribes the voice message, then sends the text of the transcription to the user's device. This method has the disadvantage of lacking complete integration with the user's email system. One part of the communication is the original voice call, which is disconnected from the later email in which the transcribed text is sent. Thus, the entire history of the communication is not readily available for archiving or audit purposes, for example. Another disadvantage is that each voicemail is treated in the same way, whether or not any user benefit is derived from having the transcription performed.

Another conventional example of voicemail transcription is provided by SimulScribe™, Inc. SimulScribe™ provides a service that includes redirecting the user's callers to an intermediary voicemail system that performs transcription of all voicemails and forwards the text result to the user's phone. This method has the same disadvantages previously mentioned. Other disadvantages of various prior methods include a requirement for the user to give callers a different number in order to receive transcription, and the lack of privacy or confidentiality guarantees to callers who may not wish their voicemails to be transcribed, or may wish to control the disposition of transcripts.

INCORPORATION BY REFERENCE

All publications and patent applications mentioned in this specification are herein incorporated by reference to the same extent as if each individual publication or patent application was specifically and individually indicated to be incorporated by reference.

Figure 1:
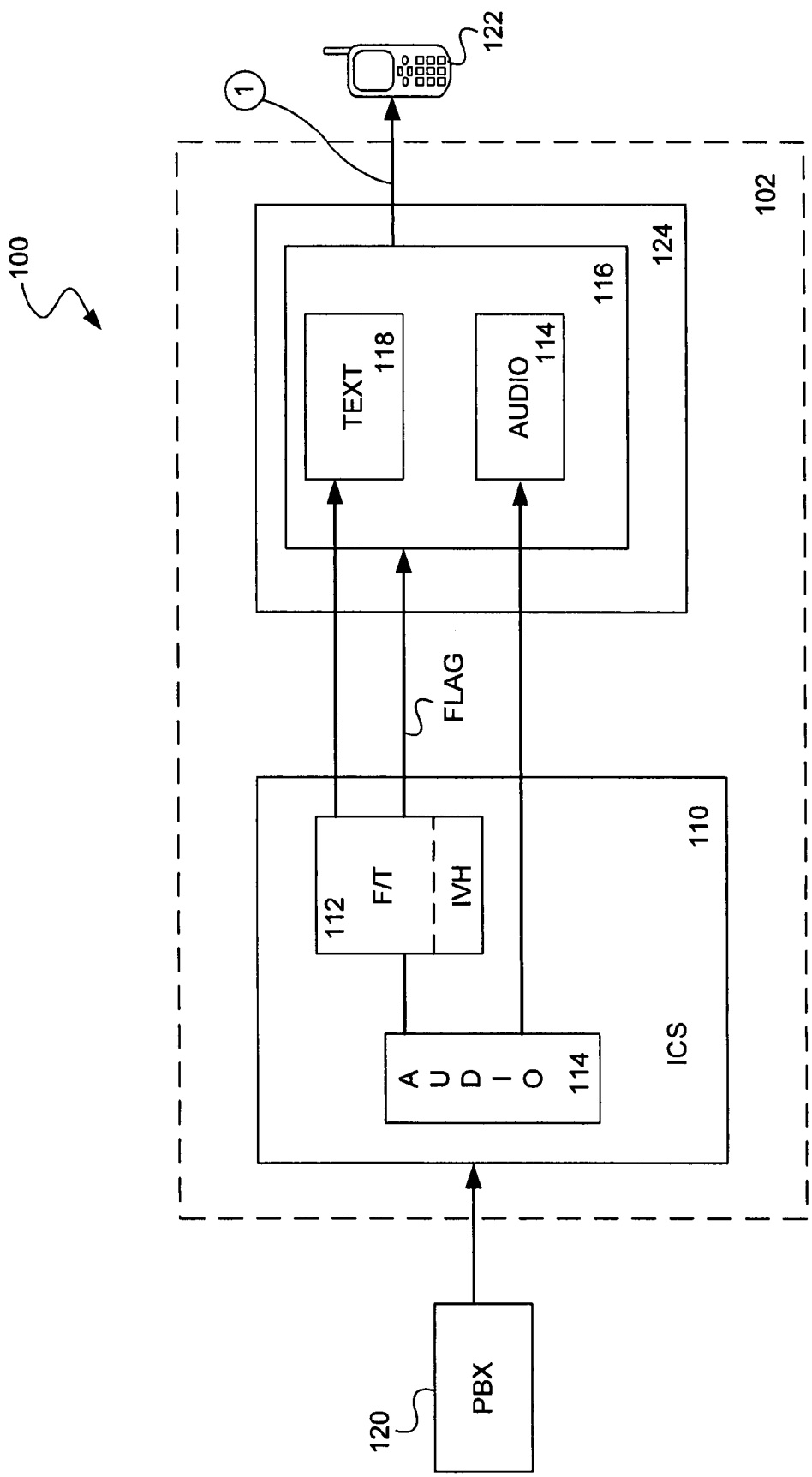
FIG. 1 is a block diagram of a system that includes an integrated communication system ("ICS"), under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 110 is first introduced and discussed with respect to FIG. 1).

DETAILED DESCRIPTION

Systems and methods for voicemail filtering and transcription are described herein. According to various embodiments, an integrated communication system performs filtering and transcription of voicemails and forwards the voicemails via email to a user's email-capable device. For example, the email is sent to a system including an email server, from which the email is sent to the user's device. In an embodiment, a filter/transcribe module filters received voicemails of a user, either automatically or on demand as specified by the user. Filtering includes looking for predetermined words in the voicemail. One result of filtering is determining a relative urgency of the voicemail message. The integrated communication system further performs a rough transcription of the voicemail, either automatically or on demand as specified by the user. The rough transcription is not intended to be word-for-word, but rather provides enough of the message content to allow the user to very quickly review the rough transcription and determine the appropriate action to take in response to the voicemail. According to embodiments, the rough transcription is entered as text in an email that is sent to the user. In various embodiments, an audio file of the original voicemail is an attachment to the email. Further, if the voicemail message is determined (by the filtering) to be urgent, a priority flag indicating high priority is attached to the email. In an embodiment, a user may request a refined transcription of the voicemail by pressing a button on the user's device. The refined transcription is a highly accurate transcription of the voicemail. In an embodiment, the rough transcription is replaced by the refined transcription in the original email and the original is marked "unread" in the user's email inbox on the user's device.

As used herein, "integrated communication systems" or "ICSs," integrate different types of messaging so that a user of the ICS can access multiple types of messages (e.g., voicemail messages, electronic mail, email messages, instant messaging messages, SMS (Short Messaging System) messages, MMS (Multimedia Messaging System) messages, etc. with a single message interface. In providing integrated messaging functionality via a single message interface, the ICS of an embodiment relieves the dependency on a voicemail system, for example, by providing users with access to voicemail messages and capabilities of the voicemail system through the local groupware applications and email messaging system. The systems and methods described herein are applicable to any ICS. In an embodiment, the ICS is part of an enterprise system, and is integrated with an enterprise groupware application, but the claimed invention is not so limited. In other embodiments, the ICS is not part of an enterprise system, but is accessible to users, for example, via the internet and/or a wireless communication network.

In the following description, numerous specific details are introduced to provide a thorough understanding of, and enabling description for, embodiments of filtering and transcription. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

FIG. 1 is a block diagram of a system 110 that includes a networked environment 102. Networked environment 102 includes one or more networks of any kind over which data can be communicated, including local area networks ("LANs"), wide area networks ("WANs") the Internet, and any wired or wireless communication networks, in any combinations. System 110 also includes an ICS 110 and a messaging server/messaging store 124. ICS 110 communicates with a public branch exchange ("PBX") 120 to receive phone calls for a user, including voicemails. ICS 110 further includes a filter/transcribe module ("F/T module") 112. As described further below, F/T module 112 accesses an audio file 114 of the voicemail message. In various embodiments, the audio file is created by any conventional method as usually employed by a voicemail system, such as a voicemail system that is part of ICS 110. Audio file 114 may be created on other devices in networked environment 102, such as mobile devices. A Waveform audio format file ("WAV file") 114 is shown as an example, but embodiments are not so limited. For example, in alternate embodiments, the audio file may be any other electronic audio data format. In further embodiments, the source of the audio data is not a voice mail, but is any other audio data transmitted via a network, including for example, an audio file whose source is an internet website.

F/T module 112 also performs filtering of the voicemail message, which includes searching for predetermined words in the voicemail. In an embodiment, the words searched for are in a word list that contains certain default words that connote urgency, such as "urgent" "important" "immediately" "ASAP", etc. However, filtering may include searching for any words that connote anything, including words or names that indicate the message is "not urgent". In addition, in some embodiments, the user may add words to the word list, including names of people who can be callers or subject of the voicemail message. The user may specify that these added words, if found in the search, always be included in the rough transcription. Also, the user may specify that if certain words from the word list are found in the search, other words are included in the rough transcription. For example, if "Company X" is found, include "Highest Priority" in the rough transcription. The rough transcription facilitates the user determining an appropriate response to the voice message. In yet other embodiments, ICS 110 is integrated with an enterprise groupware application, and users are members of the enterprise. In this case, all of the enterprise data is available to F/T module 112, including contact lists, user voicemail preferences, user email preferences, etc. In yet other embodiments, a user may designate other sources in the user's networked environment for words to be used in the search. Web-based consumer relationship management (CRM) applications, customer support systems, and internal accounting system are just a few examples, but there are many others.

Any of this information can be used to filter the voicemail as desired. If predetermined words are found in the voicemail, a priority email flag is generated. The priority email flag is compliant with a user device 122 and is a visual cue to urgency of an email message in a message list, but embodiments are not so limited. The priority flag may also include an audio notification or alert instead of, or in addition to, the visual flag.

F/T module 112 further includes an intelligent voicemail handler (IVH) in an embodiment. The IVH requests refined transcriptions on its own initiative, for example by applying rules to the information described above. As an example, the information available to the IVH includes the user's calendar. This allows the IVH to automatically set a particularly non-intrusive notification type for emails that contain voicemail messages when the IVH knows the user is in a meeting. Also, the IVH automatically requests a refined transcription when the user is in a meeting. The IVH in some embodiments includes an adaptive rules engine that modifies its behavior based on history, including which words occurred more in emails for which refined transcriptions were requested by the user, etc.

F/T module 112 performs a rough transcription of the voicemail, either automatically or on demand as specified by the user. The rough transcription is not intended to be word-for-word, but rather provides enough of the message content to allow the user to very quickly review the rough transcription and determine the appropriate action to take in response to the voicemail. According to an embodiment, the rough transcription is entered as text 118 in an email 116 that is sent to the user (as shown by arrow 1) via a messaging server/messaging store 124. Audio file 114 is also attached to email 116 in an embodiment, and the user can listen to the voicemail by playing audio file 114 on the user device 122.

Figure 2:
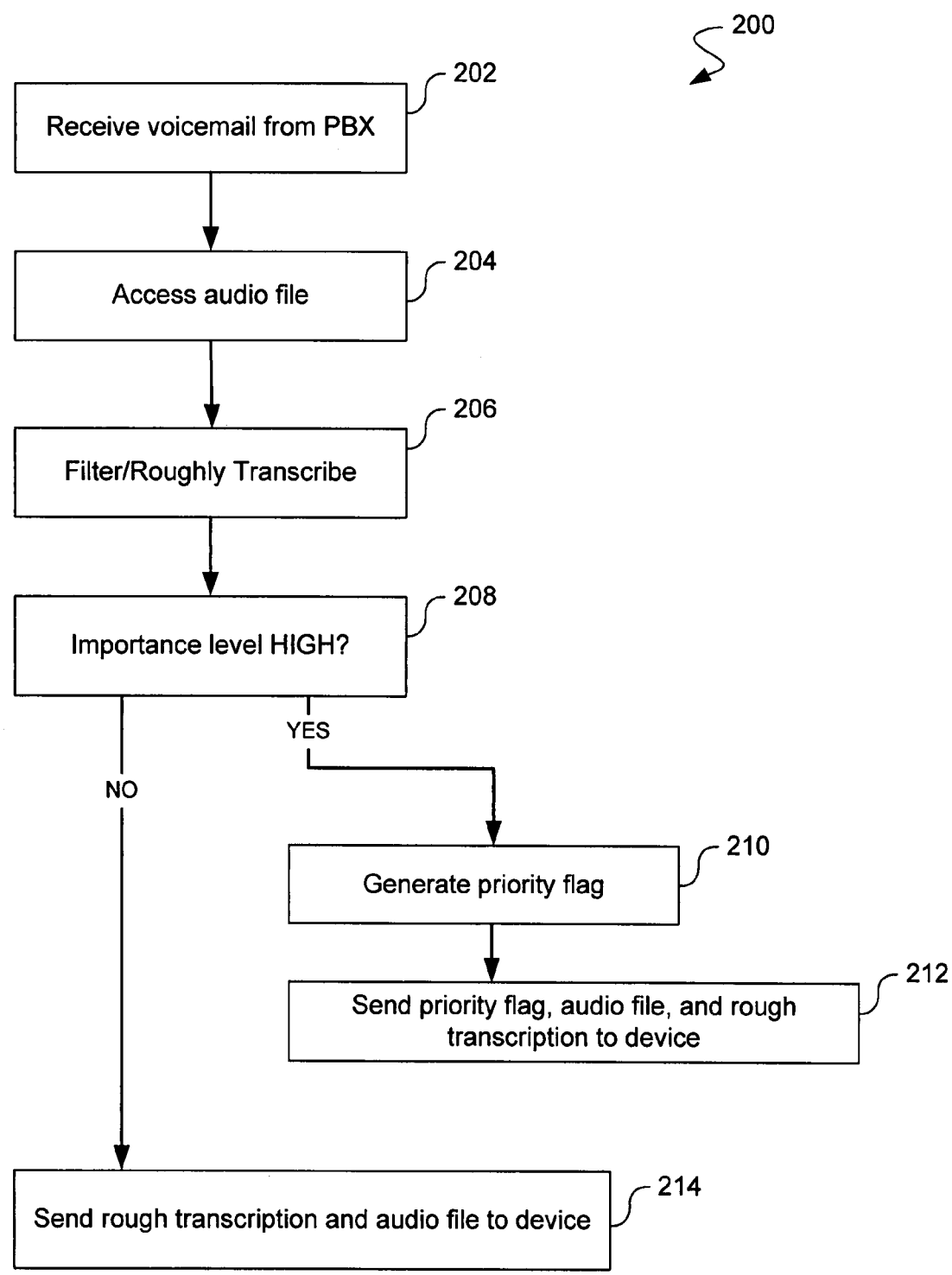
FIG. 2 is a flow diagram of filtering a voicemail and generating a rough transcription, under an embodiment.

FIG. 2 is a flow diagram of a process 200 of filtering a voicemail and generating a rough transcription, under an embodiment. At 202, a voicemail is received from PBX 120. F/T module 112 accesses audio file 114 at 204, and filters and roughly transcribes the voicemail at 206. If the filtering indicated any urgency in the voicemail (or if it is determined that the importance level is high) at 208, a priority flag is generated at 210. The priority flag, audio file, and rough transcription are sent to the device via the messaging server/messaging store at 212.

If the filtering did not indicate urgency, then the audio file and rough transcription are sent to the device via the messaging server/messaging store at 214. In various embodiments, the exact order of events may not be as shown in FIG. 2. Process 200 is just one example of a process as claimed. In other embodiments, an email may be stored in the messaging server/messaging store before the filtering and/or transcription is performed. In yet other embodiments, filtering and storing may occur before transcription. Many other variations in the order of the actions described are within the scope of the claims.

Figure 3:
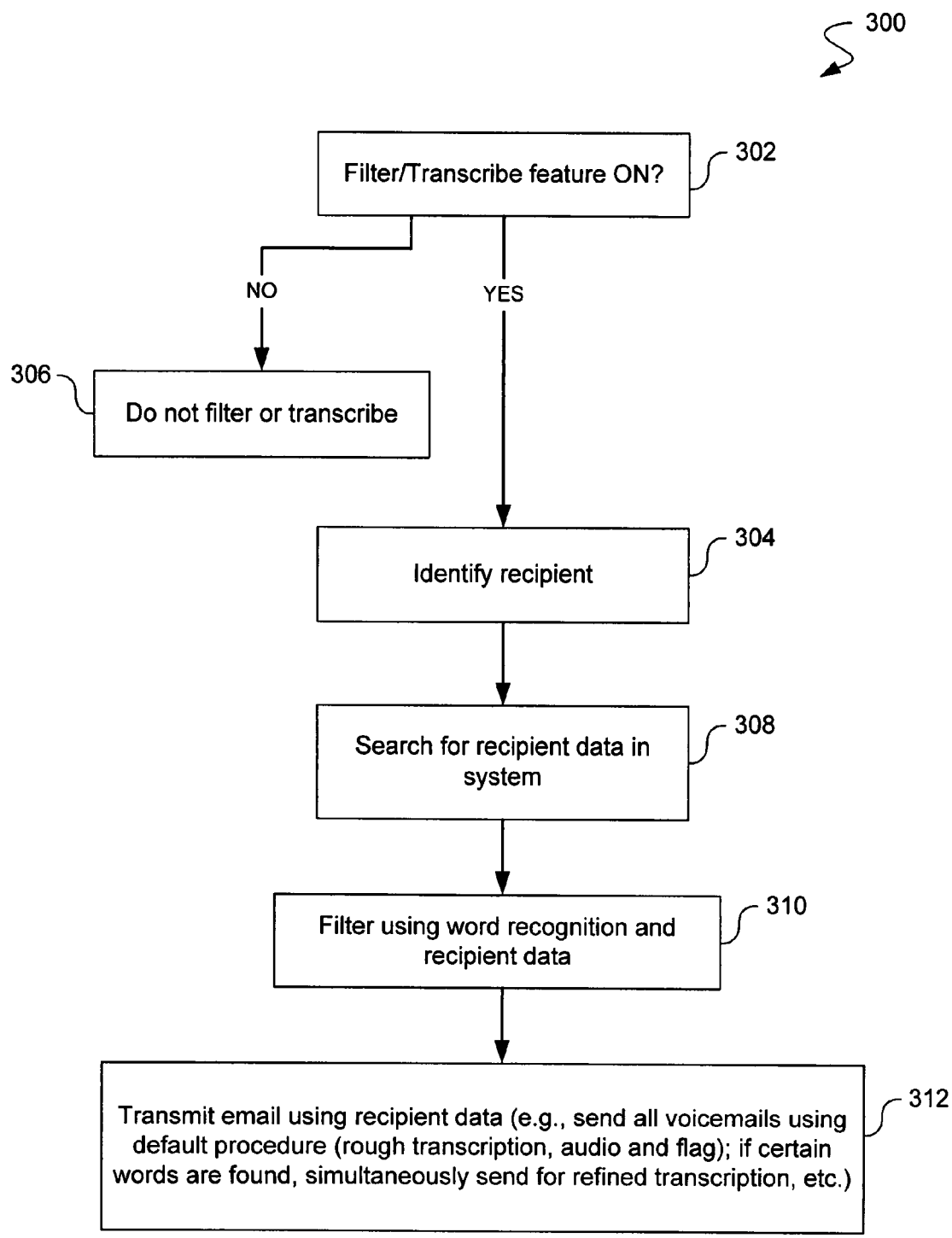
FIG. 3 is a flow diagram of filtering a voicemail and generating a rough transcription, under an embodiment.

FIG. 3 is a flow diagram of a process 300 of filtering a voicemail and generating a rough transcription, under an embodiment. At 302, ICS 110 determines whether the filter/transcribe feature is turned on. In various embodiments, the feature may be turned off completely or configured to operate in a variety of ways. If the filter/transcribe feature is not on, the voice mail is not filtered or transcribed, as shown at 306. If the filter/transcribe feature is on, the recipient of the voicemail, also referred to herein as the user, is identified at 304. According to an embodiment, the recipient's identity is used to search for any data in the system related to the recipient. For example, as further described herein, the user may designate preferences that configure the behavior of the filter/transcribe module. In addition, in embodiments that include an enterprise ICS, user data of the enterprise directory system (such as contact lists, for example) and other enterprise sources can be used to add to the word list and/or determine preferences.

At 310, filtering is performed using word recognition (against the word list) and the recipient data. At 312, an email is transmitted to the user device via the messaging server/messaging store using recipient data. For example, recipient data may include sending instructions (e.g., send all voicemails using default procedure (rough transcription, WAV and flag); if certain words are found, simultaneously send for refined transcription, etc.). Refined transcription is explained further below.

Figure 4:
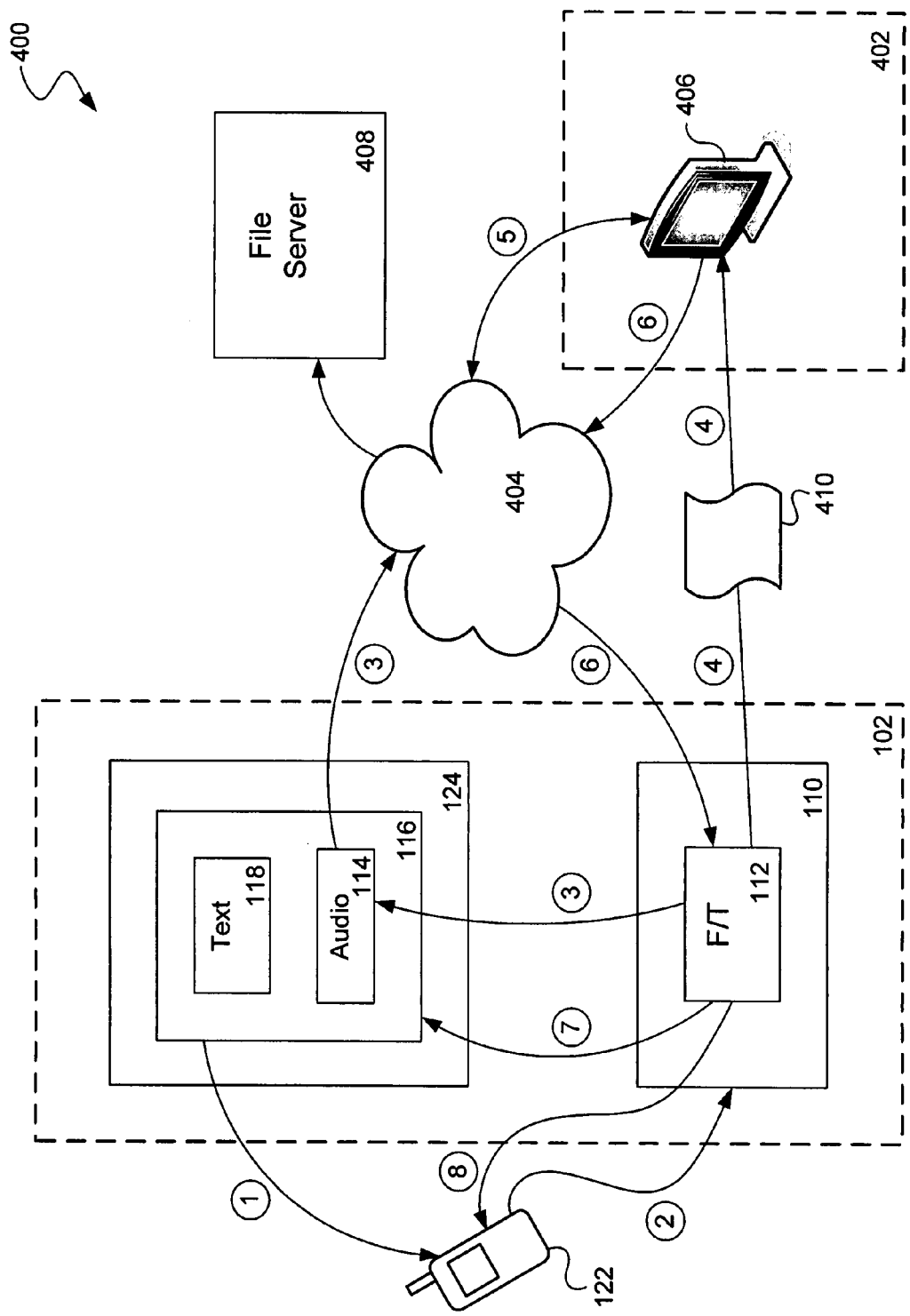
FIG. 4 is a block diagram of a system including an integrated communication system ("ICS"), and showing a flow for a process of obtaining a refined transcription, under an embodiment.

FIG. 4 is a block diagram of a system 400 including an integrated communication system ("ICS") 110, and showing a flow for a process of obtaining a refined transcription, under an embodiment. System 400 includes networked environment 102 and a networked environment 402. Environments 102 and 402 could be the same networked environment, such as different areas of a LAN or WAN, but embodiments are not so limited. Alternatively, environments 102 and 402 are distinct networked environments. Networked environment 102 includes messaging server/messaging store 124, which currently includes email message 116. Email message 116 includes audio file 114 as an attachment, and text body 118. In alternative embodiments, text 118 may also be an attachment, but it is usually more expedient for the user to view text 118 as an email message body.

ICS 110 includes F/T module 112. At least one network, here indicated as network 404, is coupled to environments 102 and 402. As described herein, "network" always implies any one or more of the network types previously listed. Networked environment 402 includes a computer 406, which will be referred to herein as a transcriber computer. Transcriber computer 406, or transcriber 406, as used herein encompasses both a computer performing transcription using voice recognition software, and a human transcriber. In some embodiments, computer 406 is the device performing a refined transcription, while in other embodiments, computer 406 is a machine used by a human transcriber. In either case, computer 406 is a device at which a request for a refined transcription is received from F/T module 112, as further described herein. A file server 408 is coupled to environments 102 and 402 via network 404. In other embodiments, file server 408 is not a "web server" coupled as shown, but is a file server included in a networked environment, such as environment 102 or environment 402. In general, file server 408 is accessible to both environment 102 and environment 402.

With reference to the numbered arrow on the diagram, a process for obtaining a refined transcription will now be described. As indicated by arrow 1, email message 116 is displayed on user device 122. The user can open and view email message 116 in the email inbox of the device 122, along with the priority flag, if applicable. When email 116 is opened, the text 118 is visible as the body of email 116. The user can quickly review the rough transcription provided by text 118 and decide whether a refined transcription is necessary. At a glance, the user can determine at least the following from text 118: no immediate action should be taken in response to the voicemail message; a known action should be taken, and the urgency is known; or the urgency or ambiguity of text 118 calls for a refined transcription. As used herein "refined transcription" indicates a transcription of the audio file of the original voicemail message that would be determined by the user to be more complete and more accurate.

If the user decides a refined transcription is needed, the user sends a request to ICS 110, as shown by arrow 2. In an embodiment, the user merely presses a button on the device 122 to make this request. Alternatively, the request is made by a voice command, for example, or always done automatically. The request is received by F/T module 112, which responds by retrieving the audio file 114 from the messaging server/messaging store 124, and placing it on file server 408 via network 404 as shown by arrow 3. F/T module 112, in an embodiment, generates a request for refined transcription in the form of an instant message 410. Instant message 410 is sent to the computer 406 as shown by arrows 4. Computer 406 receives instant message 410. In the case of a human transcriber, the transcriber reads instant message 410, which includes instructions on where to access file server 408 to fetch audio file 114. The transcriber fetches audio file 114, as shown by arrow 5. The transcriber listens to audio file 114 while typing the refined transcription into a designated area of the user's screen in the normal manner for instant messaging. The completed refined transcription is sent back to ICS 110 via instant message 410, as shown by arrow 6. In alternative embodiments, the transcriber sends the completed refined transcription via any electronic message, including but not limited to, an email message. An instant message is just one example of an electronic message that can be used for this purpose.

F/T module 112 replaces the rough transcription in text 118 with the refined transcription, and marks the original email as "unread", as shown by arrow 7. F/T module 112 then sends a notification to the user (arrow 8) to indicate the request for the refined transcription is fulfilled. The user can now view the original email in the device 122 inbox, marked as unread, and containing the refined transcription.

Figure 5:
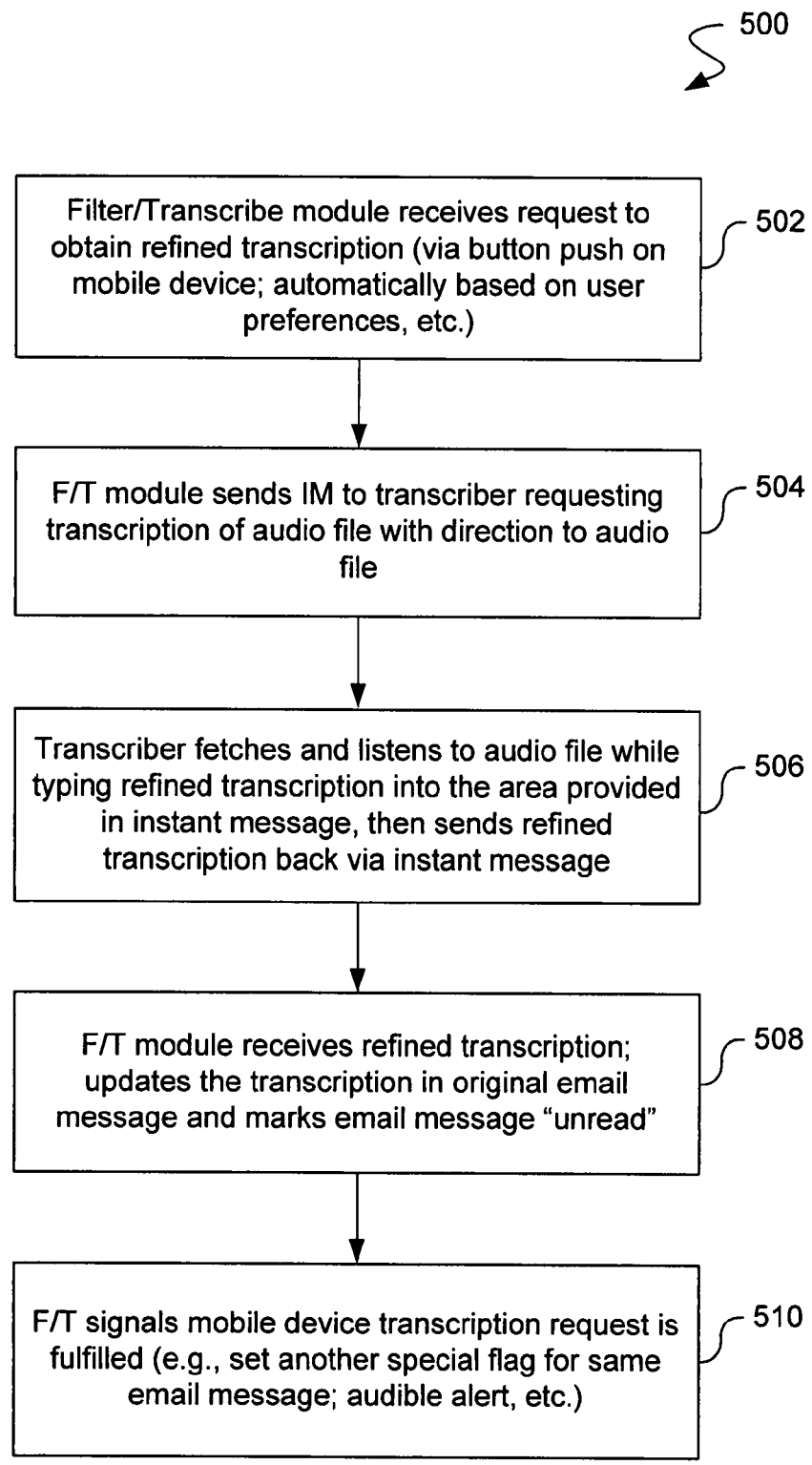
FIG. 5 is a flow diagram of a process of obtaining a refined transcription, under an embodiment.

FIG. 5 is a flow diagram of a process 500 of obtaining a refined transcription, under an embodiment. At 502, F/T module 112 receives a request from a user to obtain a refined transcription. In various embodiments, the user may send the request by pushing a button on the device 122. In alternative embodiments, the request may be automatically generated based on user preferences, or based on finding certain words in the voicemail, etc. Many alternatives are within the scope of the claimed invention. For example, a refined transcription may always be requested automatically, a refined transcription may be automatically requested, no rough transcription performed, but filtering is performed, etc. F/T module 112, at 504, sends instant message 410 to the computer or transcriber 406 with directions to audio file 114. The computer or transcriber 406 fetches audio file 410 and listens to the file while typing the refined transcription into an area of the transcriber's screen; then sends the refined transcription via instant message 410 back to ICS 110 at 506.

F/T module 112 receives the refined transcription via instant message 410, updates the rough transcription in original email message 116 by replacing text 118 with the refined transcription, and marks email message 116 "unread" at 508. At 510, F/T module 112 signals user device 122 that the transcription request is fulfilled. In various embodiments, signaling can include one or more different forms of notification, including a special email flag, an audible alert, etc.

Figure 6:
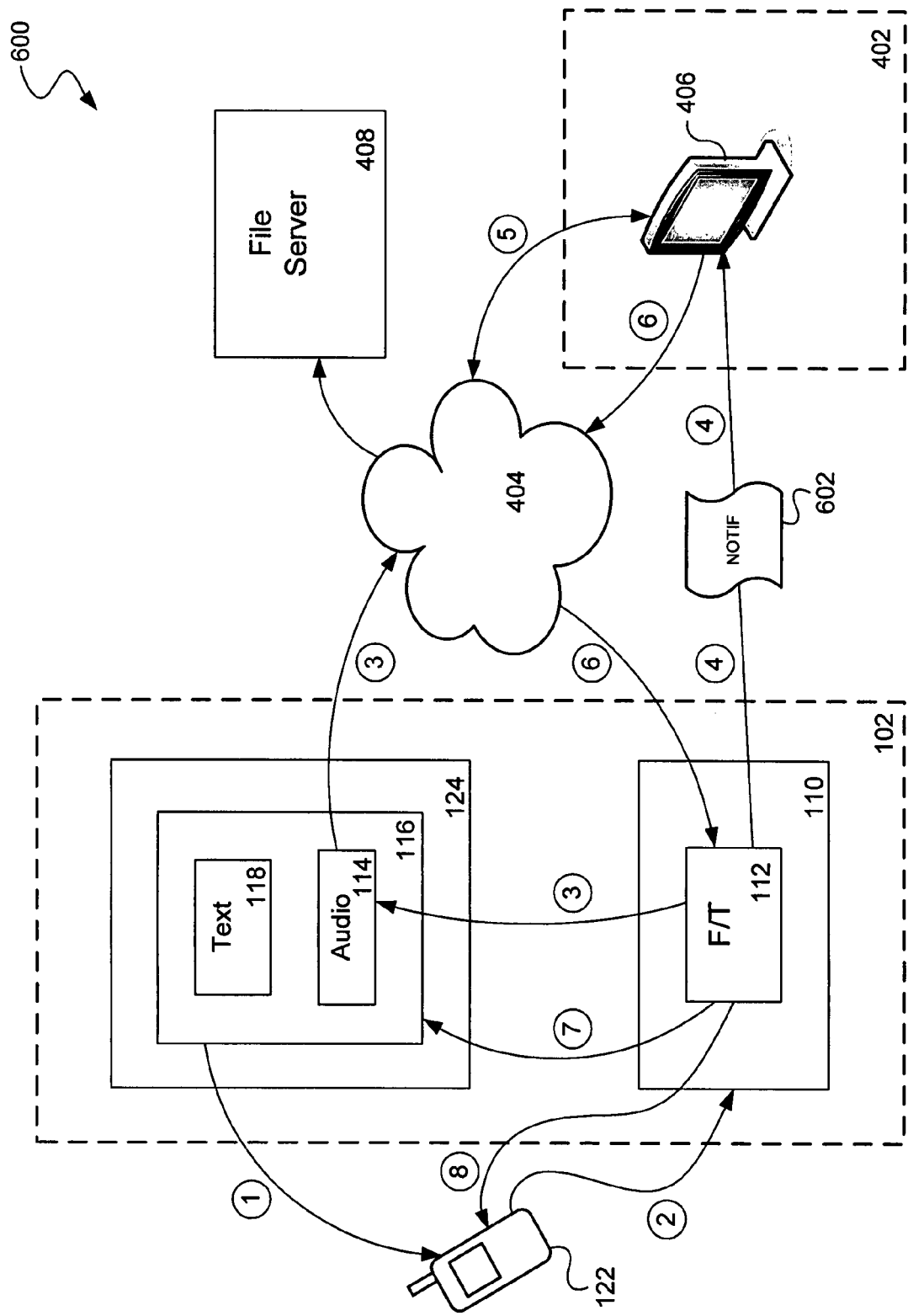
FIG. 6 is a block diagram of a system including an integrated communication system ("ICS"), and showing a flow for a process of obtaining a refined transcription, under an embodiment.

FIG. 6 is a block diagram of a system 600 including an ICS 110, and showing a flow for a process of obtaining a refined transcription, under an embodiment. System 600 includes networked environment 102 and networked environment 402. Networked environment 102 includes messaging server/messaging store 124, which currently includes email message 116. Email message 116 includes audio file 114 as an attachment, and text body 118. In alternative embodiments, text 118 may also be an attachment, but it is usually more expedient for the user to view text 118 as an email message body.

ICS 110 includes F/T module 112. At least one network, here indicated as network 404, is coupled to environments 102 and 402. Networked environment 402 includes transcriber computer. Transcriber computer 406, or transcriber 406, as used herein encompasses both a computer performing transcription using voice recognition software, and a human transcriber. In some embodiments, computer 406 is the device performing a refined transcription, while in other embodiments, computer 406 is a machine used by a human transcriber. In either case, computer 406 is a device at which a request for a refined transcription is received from F/T module 112, as further described herein. File server 408 is coupled to environments 102 and 402 via network 404. As previously described, file server 408 may be any file server in any location accessible to environment 102 and environment 402, and is not limited to the configuration shown.

With reference to the numbered arrow on the diagram, a process for obtaining a refined transcription will now be described. As indicated by arrow 1, email message 116 is displayed on user device 122. The user can open view email message 116 in the email inbox of the device 122, along with the priority flag, if applicable. When email 116 is opened, the text 118 is visible as the body of email 116. The user can quickly review the rough transcription provided by text 118 and decide whether a refined transcription is necessary. At a glance, the user can determine at least the following from text 118: no immediate action should be taken in response to the voicemail message; a known action should be taken, and the urgency is known; or the urgency or ambiguity of text 188 calls for a refined transcription.

If the user decides a refined transcription is needed, the user sends a request to ICS 110, as shown by arrow 2. In an embodiment, the user merely presses a button on the device 122 to make this request. The request is received by F/T module 112, which responds by retrieving the audio file 114 from the messaging server/messaging store 124, and placing it on file server 408 via network 404 as shown by arrow 3. F/T module 112, in an embodiment, generates a request for refined transcription in the form of a notification 602. In various embodiments, notification 602 includes an instant message, an email, an SMS, and a voice message, but embodiments are not so limited. Notification 602 is sent to the computer 406 as shown by arrows 4. Computer 406 receives notification 602. In the case of a human transcriber, the transcriber reads notification 602, which includes instructions on where to access file server 408 to fetch a web page that includes audio file 114. The transcriber navigates to the web page and fetches audio file 114, as shown by arrow 5. The transcriber listens to audio file 114 while typing the refined transcription onto the web page (as shown further with reference to FIG. 7). When the refined transcription is finished, the transcriber clicks a button or link on the web page to send the refined transcription to F/T module 112, as shown by arrow 6.

F/T module 112 replaces the rough transcription in text 118 with the refined transcription, and marks the original email as "unread", as shown by arrow 7. F/T module 112 then sends a notification to the user (arrow 8) to indicate the request for the refined transcription is fulfilled. The user now views the original email in the device 122 inbox, marked as unread, and containing the refined transcription. The method illustrated and described with reference to FIG. 6 is just one example of an embodiment. Alternatively, the email is not marked "unread", but the alert is sent to the user, for example. Also alternatively, the refined transcription is appended to the rough transcription, rather than replacing it. As another alternative, a second email that contains the refined transcription is sent to the user.

In embodiments described herein, voicemail messages are transcribed for email users without using more than one email message. For embodiments in which the original email message containing the audio file is the same email used throughout processes described herein, ease of tracking message history is greatly enhanced. It is easier for the user to track the history of a message thread. It is also much easier for the user and/or enterprise administrator to archive message threads that include transcription processes. Complete and accurate message archives are increasingly required for compliance with auditing processes, legal discovery processes, Securities and Exchange Commission (SEC) processes, etc.

Figure 7:
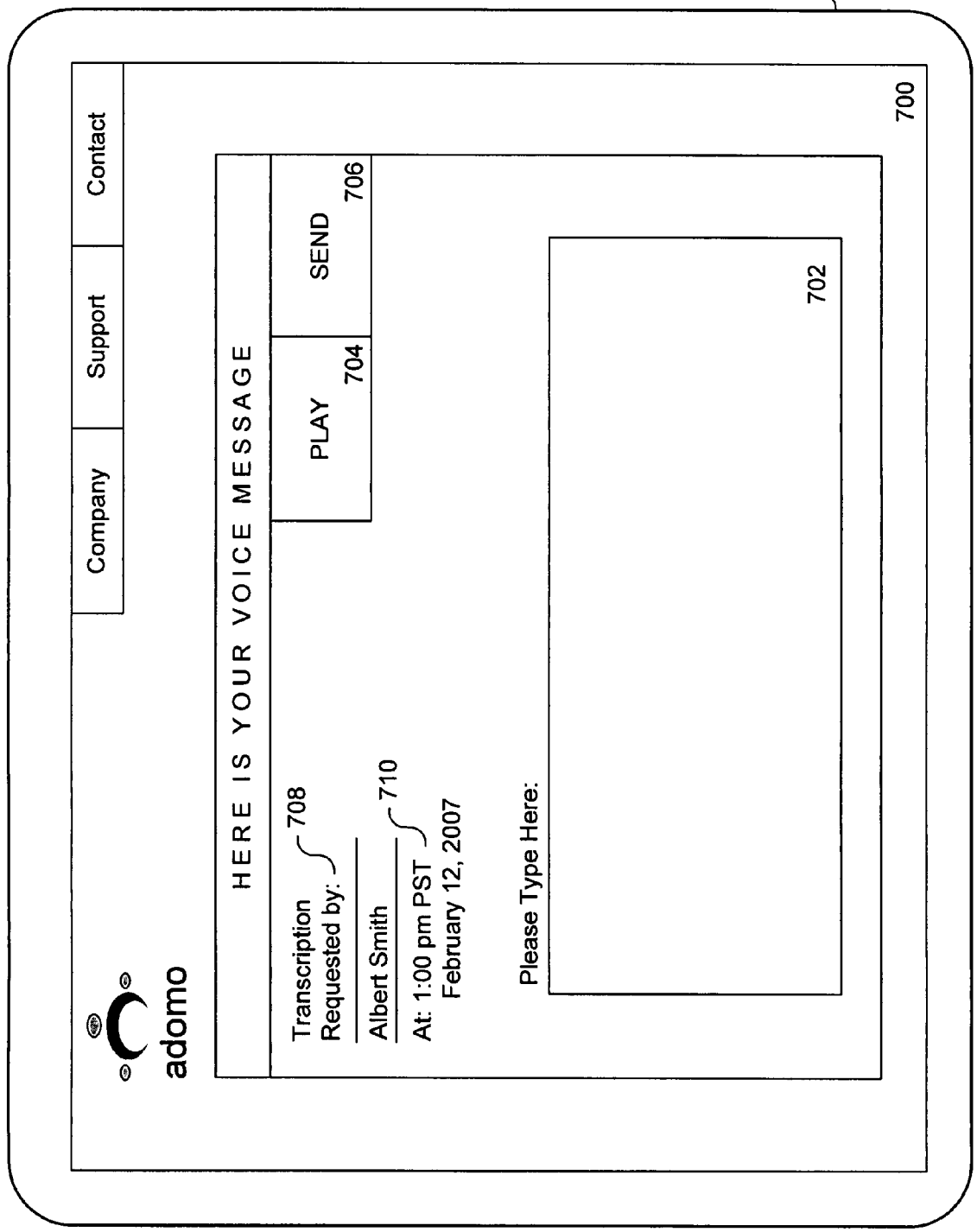
FIG. 7 is a block diagram of a web page for listening to and transcribing a voicemail, under an embodiment.

FIG. 7 is a block diagram of a web page 700 on computer 406 for listening to and transcribing a voicemail, under an embodiment. Web page 700 is an embodiment of a web page as referred to above with reference to FIG. 6. Web page 700 includes information regarding the voice mail, such as the identity of the requester 708, and the time of the request 710. There is an area 702 for typing the refined transcription. The audio file of the voicemail is played by clicking "PLAY" button 704. When the refined transcription is complete, the refined transcription is sent back to ICS 110 by clicking "SEND" button 706.

Figure 8:
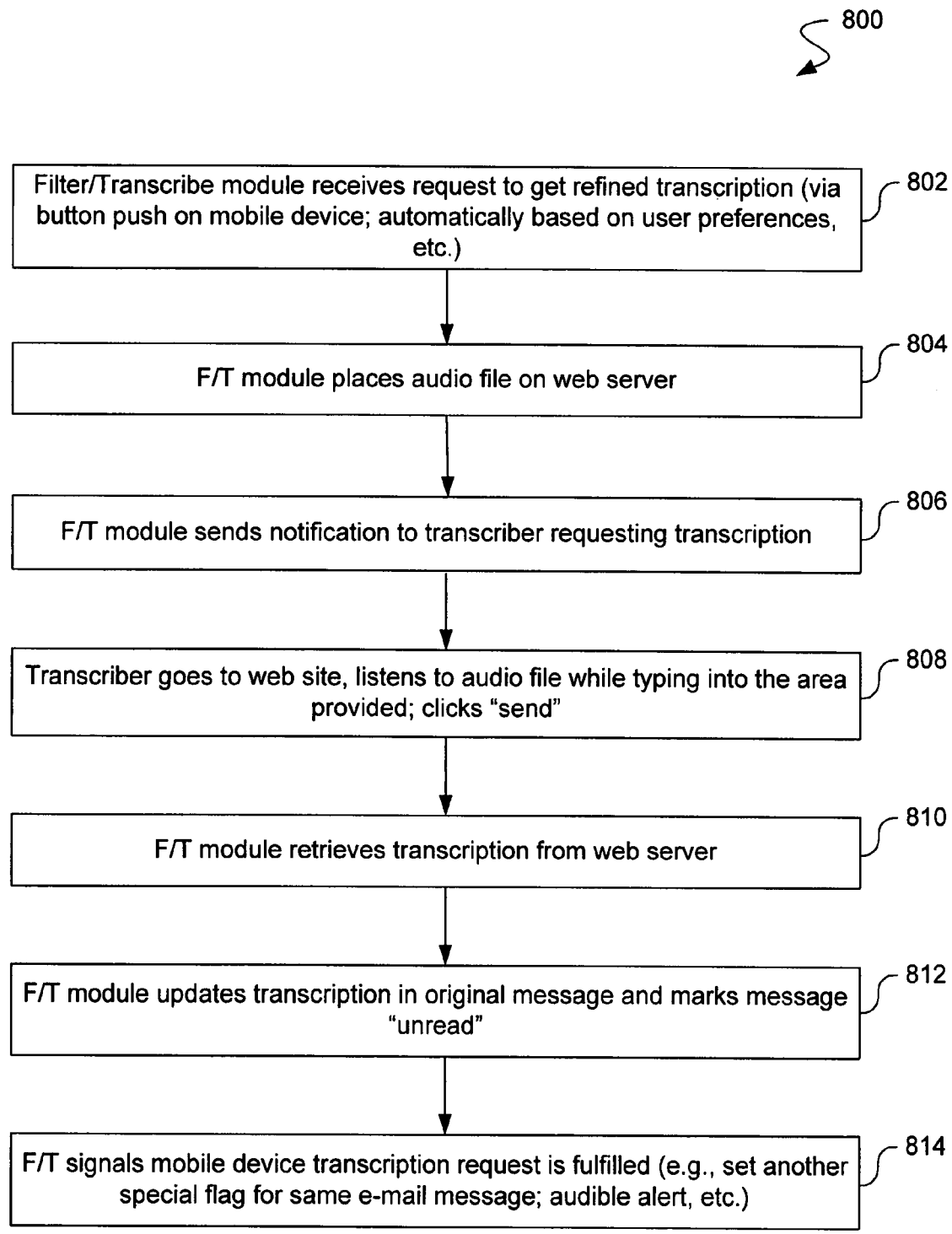
FIG. 8 is a flow diagram of a process of obtaining a refined transcription, under an embodiment such as the embodiment of FIGS. 6 and 7.

FIG. 8 is a flow diagram of a process 800 of obtaining a refined transcription, under an embodiment such as the embodiment of FIGS. 6 and 7. At 802, F/T module 112 receives a request to obtain a refined transcription. The request may be sent by the user pushing a button on the user mobile device. Alternatively, the request may be sent automatically based on user preferences, such as identification of certain words or names in the voicemail. In response to the request, F/T module 112 places the audio file of the voicemail on the file server at 804.

At 806, F/T module 112 sends a notification to the transcriber requesting transcription. The transcriber, at 808, navigates to an indicated web site. For example, the notification may include a hyperlink to the appropriate web page. The transcriber listens to the audio file while typing into the area provided in the web page, then clicks "SEND".

At 810, F/T module retrieves the refined transcription from file server 408. F/T module 112 updates the rough transcription in the original message with the refined transcription and marks the original email message "unread" at 812. F/T module 112 then signals the user mobile device that the transcription request is fulfilled at 814. This signal may include a special email flag on the original email that appears in the message list. This signal may also include an audible alert instead of, or in addition to the flag.)

In some embodiments, F/T module 112 is adaptive in order to increase accuracy and usefulness of the transcription processes as described herein. For example, the word list that is use in filtering may automatically adapt to include or exclude words based on which words are included in voicemails for which refined transcription are requested over time.

Figure 9:
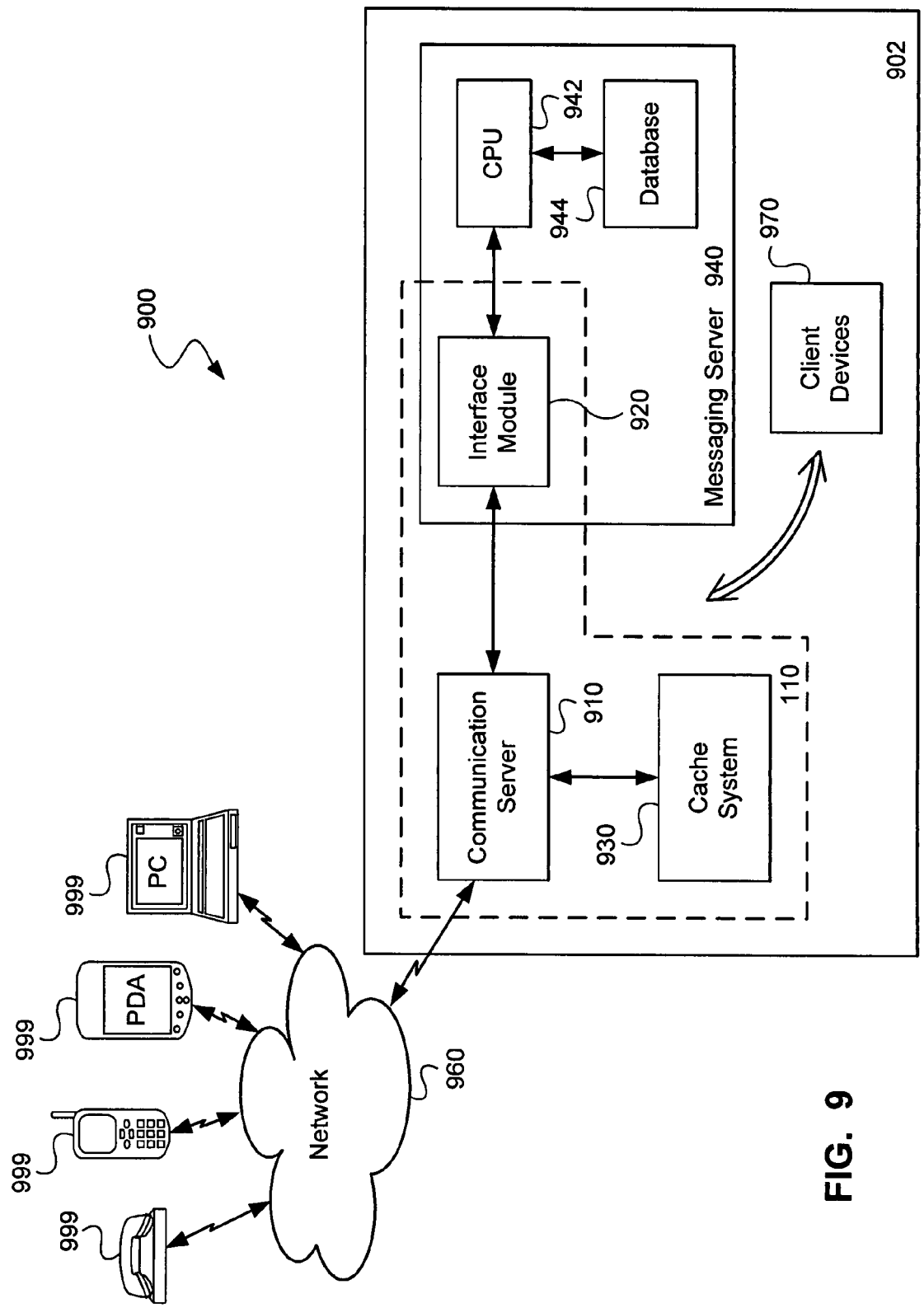
FIG. 9 is a block diagram of a system that includes an ICS, under an embodiment.

FIG. 9 is a block diagram of a system 900 that is includes ICS 110, and executes the processes as previously illustrated and described. System 900 includes a networked environment 902. Networked environment 902 includes one or more networks of any kind over which data can be communicated, including local area networks ("LANs"), wide area networks ("WANs"), the Internet, and any wired or wireless communication networks, in any combinations.

System 900 further includes an ICS 110, under an embodiment. ICS 110 includes a communication server 910, an interface module ("IM") 920, and a cache system 930 (also referred to as the "cache"), but is not so limited. Communication server 910 couples to components of any number of networks 960 using any of a variety of communication protocols. Network 960 and networked environment 902 may be of the same or of different types. Network 960 and networked environment 902 allow for information transfers between various client devices 970 and 999, also referred to as user devices 970 and 999.

IM 920 of ICS 110 couples to transfer information or data with communication server 910. Additionally, IM 920 couples to transfer information with one or more components of a messaging server 940, where transferring information includes one or more of pulling, receiving, retrieving, polling, transmitting, and pushing operations, to name a few. As an example of an information transfer between IM 920 and messaging server 940, IM 920 pulls user information from messaging server 940 and makes the pulled user information available to other components of ICS 110, wherein the user information includes information relevant to at least networked environment 902.

The components of messaging server 940 may include for example one or more processors 942, also referred to as "central processing units" or "CPUs," and one or more databases 944 coupled to CPU 942. In an embodiment, IM 920 may be hosted on or running under control of messaging server 940, but is not limited to this configuration. Further, messaging server 940 may be a component of networked environment 902 that hosts communication server 910, but is not so limited. For example, messaging server 940 may be hosting a groupware application (e.g., Microsoft Exchange, LotusNotes, etc.) of networked environment 902.

Cache 930 couples to communication server 910 and communicates to transfer information with one or more of communication server 910, IM 920, and one or more components of messaging server 940, as described below. Cache 930 may also couple to additional components (not shown) of network 950.

As an example of information transfers between cache 930 and communication server 910, cache 930 may receive caller information (e.g., voicemail messages, caller identification, etc.) from client devices 999 via communication server 910. An example of information transfers between cache 930 and messaging server 940 includes transfers in which cache 930 receives user information from messaging server 940, where the user information may be routed from messaging server 940 via IM 920 and/or communication server 910. Another example of information transfers between cache 930 and messaging server 940 includes transfers in which messaging server 940 receives information from cache 930 routed from cache 930 via communication server 910 and/or IM 920.

Examples of information transfers between cache 930 and IM 920 include transfers of user information pulled from messaging server 940 by IM 920 and directed to cache 930, and transfers in which IM 920 directs a message from at least one of messaging server 940 and cache 930 to at least one device on network 960 and networked environment 902 using the user information. Cache 930 holds or temporarily stores the received information under the above examples.

Network 960 and networked environment 902 include various network components (not shown) of one or more communication service providers or carriers, but are not so limited. Further, network 960 and networked environment 902 and corresponding network components can be any of a number/combination of network types known in the art for providing communications among coupled devices 970 and 999 including, but not limited to, proprietary networks, local area networks ("LANs"), metropolitan area networks ("MANs"), wide area networks ("WANs"), backend networks, public switched telephone networks ("PSTN"), the Internet, and other public networks for example. Additionally, networks 950 and 960 may include hybrid networks that use a proprietary network for some portion of the communications routing, for example, while using one or more different public networks for other portions of the communications routing.

Client devices 970 and 999 include communication devices like telephones, cellular telephones, and radio telephones. Client devices 970 and 999 also include processor-based devices like, for example, portable computers ("PC"), portable computing devices, personal digital assistants ("PDA"), communication devices, cellular telephones, portable telephones, portable communication devices, and user devices or units. Client devices can include so-called multi-modal devices, where the user can interact with the device and/or the ICS through any form of input and output, such as text input, speech recognition, text output, text-to-speech, graphics, recorded files and video. In such devices, the speech recognition and text-to-speech generation may partly take place in the device and partly in the ICS. Sound and/or video may be generated by the ICS by a continuous stream of sound and/or video data sent to the device. Client devices can include all such devices and equivalents, and are not limited to any particular type of communication and/or processor-based device. In an embodiment client devices 970 are client devices operating in a private network environment 902, such as an enterprise network, while client devices 999 are client devices operating in different private network environment or under any number of public networks. The term "client devices", as used herein, encompasses user devices, or user mobile devices, as previously described.

Figure 10:
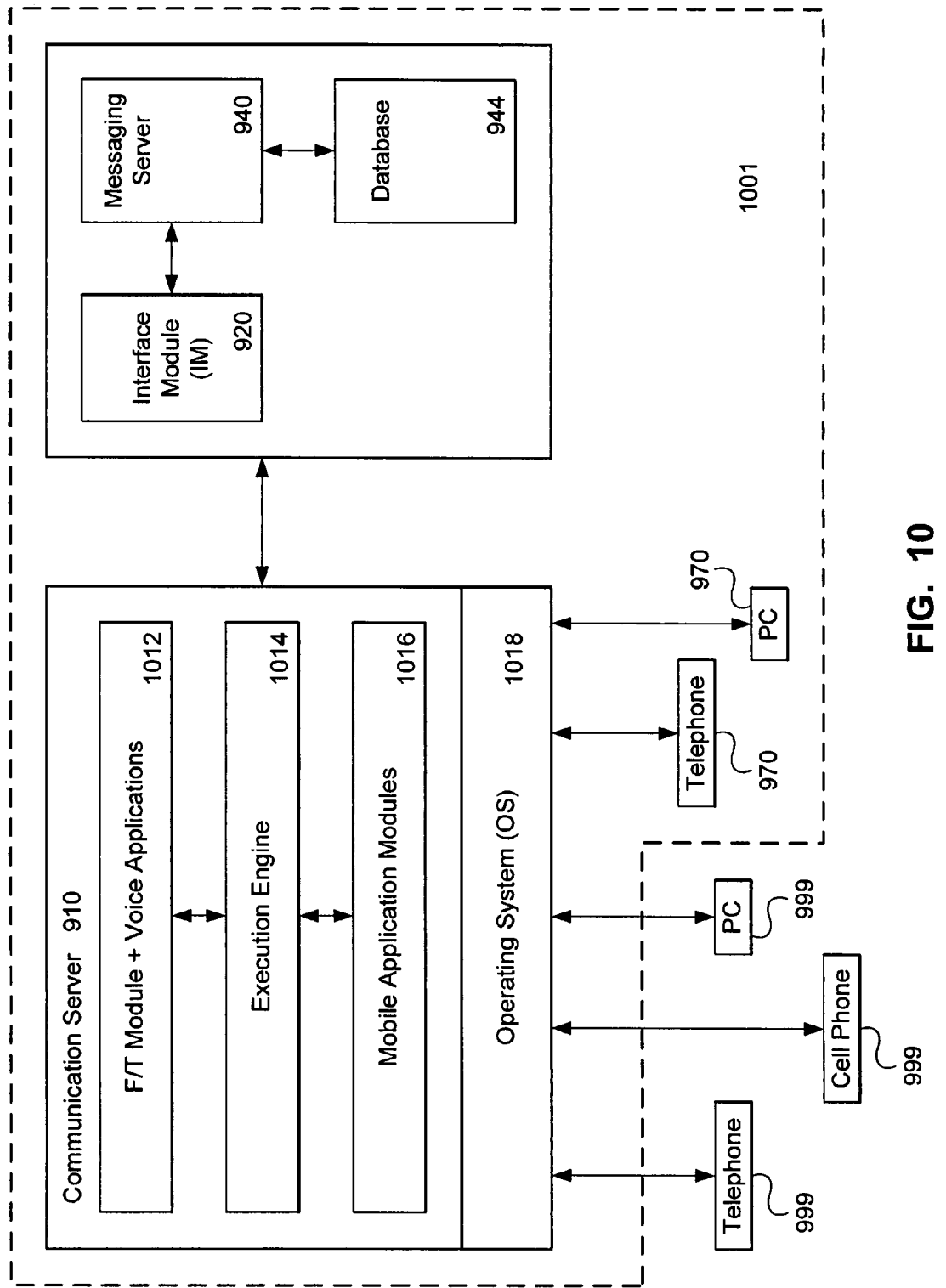
FIG. 10 is block diagram of a system showing further detail of a communication server, under an embodiment.

FIG. 10 is block diagram of a system 1000 showing further detail of communication server 910, under an embodiment. Communication server 910 couples to at least one messaging server 940 via IM 920. IM 920 runs under messaging server 940, but is not limited to running under this server. Messaging server also couples to one or more databases 944. In an embodiment, databases 944 include a messaging store as previously described. In an embodiment, networked environment is an enterprise network environment, but embodiments are not so limited. Messaging server 940 of an embodiment supports the messaging capabilities of networked environment 1001 using a groupware application (e.g., Microsoft Exchange) (not shown) along with other applications as appropriate to the size and type of networked environment 1001.

Communication server 910 couples to any number of client devices 999 external to networked environment 1001 via one or more networks (not shown). Similarly, communication server 910 couples to any number of client devices 970 local to networked environment 1001.

Communication server 910 includes an operating system 1018 as well as numerous components or subsystems. These components include but are not limited to one or more F/T modules and Voice Applications 1012, an Execution Engine 1014, and any number of Mobile Application Modules 1016, or any other type of application module.

Figure 11:
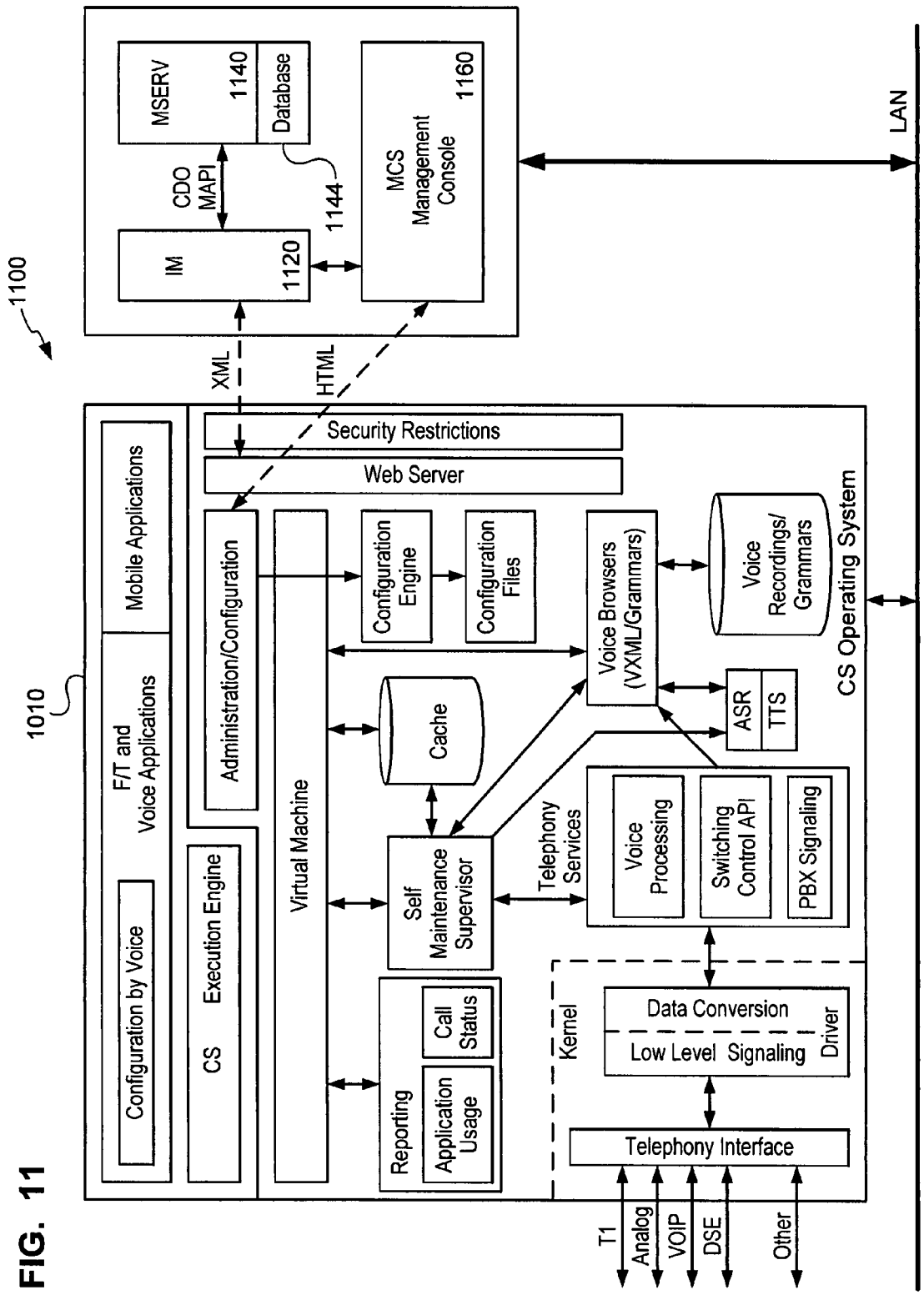
FIG. 11 is a block diagram of a system that includes a communication server, and interface module and a messaging server, under an embodiment.

FIG. 11 is a block diagram of a system 1100 that includes an ICS, including a CS 1110, an interface module and a messaging server, under an embodiment. CS 1110 may be highly scalable. According to an embodiment of the invention, CS 1110 may be configured as a modular "appliance" that is essentially self-contained, and may be, for example, encased in a stackable, "pizza-box" style server. The ICS also includes IM 1120 (also referred to herein as the "IM") and a Management Console 1160. The IM 1120, which in one embodiment runs under control of a messaging server 1140 (also referred to herein as "MSERV 1140" or "MSERV"), couples to components of the CS, the MSERV, and a Database 1144 (also referred to herein as a "Database") in a number of sequences as described herein and as appropriate to enterprise network system 1100. The IM 1120 also couples to CS Management Console 1160. The CS and the MSERV couple to the LAN for communication with other components (not shown) of system 1100.

CS 1110 in an embodiment includes an "Operating System" along with an "Execution Engine," an F/T module and some number of F/T modules ("F/T") and "Voice Applications," and some number of "Mobile Applications." The Operating System includes for example a Linux kernel with a journaling file system that provides integrity of file system tables and the data structure. The storage on the CS may be configured as a RAID (Redundant Array of Independent Disks) configuration to provide high reliability access to software and data. The Operating System supports operations of numerous other components of the CS.

With regard to the Operating System, the CS includes a "Telephony Interface" that couples calls and connects callers and users to/from the CS. The Telephony Interface couples call information to/from a private branch exchange ("PBX") (not shown) for example, where the PBX is a component of system 1100. The Telephony Interface couples to the PBX using a variety of telephony integrations that include one or more of analog, Simplified Message Desk Interface ("SMDI"), T1/E1, Voice over Internet Protocol ("VOIP"), and Digital Set Emulation ("DSE") signals, but may couple using other signals/signaling protocols. When receiving a call from the PBX, for example, the CS receives data of an incoming call from the PBX, where the data includes called party information, a reason for transfer of call (e.g., called party line busy, no answer by called party, called party using call forwarding, etc.), and calling parting information (caller ID, etc.).

A "Driver" couples information received at the Telephony Interface to the "Telephony Services" component of the CS. The Driver may perform low level signaling and/or data conversion as appropriate to the received signals. The Telephony Services include one or more components for use in processing the received signals. These components include, for example, voice processing, switching/control, and PBX signaling, but are not limited to these components.

The CS of an embodiment includes at least one "Voice Browser" that, when the CS receives a call, receives voice information of the call. The Voice Browser controls the use of automatic speech recognition ("ASR") for speech recognition and DTMF recognition. The Voice Browser of an embodiment couples to a cache or other temporary store that holds voice recordings and/or name grammars ("Voice Recordings/Grammars") (the name grammars are cached after being generated from names in a user list, in an embodiment). The store in an embodiment also contains word lists for filtering using the F/T module as described herein. In an embodiment, a default word list is applied unless a user-specific word list has been created and store for a user. The ASR in an embodiment, is used in performing the rough transcription.

The ASR may use information of the name grammars. Further, the Voice Browser controls the use of text-to-speech ("TTS") as well as the play of any number of pre-recorded prompts (e.g., WAV format files). The Voice Browser uses voice extensible markup language ("VXML") but is not limited to this protocol. Alternative embodiments of the CS may not include the Voice Browser. As an alternative to a Voice Browser, the CS may directly communicate with, or use other software or processes, for communication between the voice application and the Telephony Services and/or Driver.

The Virtual Machine, Voice Applications, and Execution Engine form a hierarchical state machine framework in which the Virtual Machine runs a number of APIs and modules. Consequently, the Voice Applications can include one component controlling the user interfaces ("UI") to the CS, and another component handling lower-level communications with the modules. Use of a loose coupling between the modules and the Voice Browser provided by the state machine framework allows independence between the languages used in the different modules and the Voice Browser. The state machine framework may receive hypertext transport protocol ("HTTP") requests from the Voice Browser, for example, and generate VXML or Speech Application Language Tags ("SALT") (SALT extends existing mark-up languages such as hypertext markup language ("HTML"), extensible hypertext markup language ("XHTML"), and extensible markup language ("XML"), and enables multimodal and telephony-enabled access to information, applications, and web services from devices like PCs, telephones, and PDAs for example).

The Voice Applications of an embodiment include a number of components including an automatic attendant, a caller interface, a user interface, and a system main menu, but may include other types of voice applications. The automatic attendant is speech enabled, but may be dual tone multi-frequency ("DTMF")-enabled. The automatic attendant, which can be enabled or disabled, uses information of contact lists (e.g., User List) in the Cache.

The Voice Applications also include at least one voicemail application. The voicemail application uses information of the Cache (e.g., User List, Global Address List, Public Folders, Personal Contact Folders) in operations that include sending a new voicemail and/or forwarding a received voicemail. In an embodiment, the F/T module accesses Cache information during filtering, for example to search for names or information in a voicemail that matched Cache information.

The voicemail application also uses Cache information in support of voicemail networking in which voicemails and corresponding information are exchanged with groupware applications of system 1100.

The voicemail application couples to the CS state machine framework described above via one or more application programming interfaces ("API"). The APIs handle the different data formats/types in use by enterprise network system 1100 (e.g., greeting data, PIN (Personal Identification Number) code data, voicemail message data, system parameters, etc.). Similarly, the Cache also couples to the state machine framework, where the Cache includes one or more of local cache and distributed cache. Therefore, communications among the voicemail application, the Cache, and the MSERV take place via the state machine framework and the APIs as appropriate to the state (e.g., offline, online) of the MSERV.

In addition to the Voice Applications, the modules running under the Virtual Machine of an embodiment include Mobile Applications. The Mobile Applications provide access to user information via mobile devices, where the access may include transferring information of email, calendar, and/or contacts to a user's mobile client device via an electronic message (e.g., SMS, MMS, and/or pager).

The CS also includes an "Administration/Configuration" manager. The Administration/Configuration manager provides access to and control of a unified configuration file of the CS. The Administration/Configuration manager uses information of the unified configuration file to provide separate Configuration Files to one or more of the components of the CS as appropriate. The unified configuration file can be copied from the CS and stored for backup purposes. Additionally, a predefined configuration file may be uploaded to the CS to provide the appropriate configuration for the CS. A browser interface to the Administration/Configuration manager allows remote access to the CS.

The CS also includes a "Self Maintenance Supervisor" or reliability server that monitors CS components and restarts failed processes when necessary, for example. In addition, the CS also includes "Security Restrictions" for use in controlling CS/port security.

As described above, the CS of an embodiment interfaces with the MSERV via the IM. The CS communicates with the IM via the Groupware Connector for example, but is not so limited. The Groupware Connector of an embodiment includes a "Web Server," but is not so limited. The MSERV functions as a messaging and collaboration server. The IM is an interface that runs under the MSERV in one embodiment to provide communications and information transfers between components of the CS and components of the MSERV. In other embodiments, the IM may run under control of the CS, for example. The IM includes and/or couples with Management Console 1160 as well as with a diagnostics component ("Diagnostics Component") and/or a run time component ("RTC") (not shown).

Management Console 1160 supports access to the CS by a system administrator of system 1100 for purposes of managing user access. Consequently, Management Console 1160 allows a system administrator to enable new users with integrated messaging functionality of the ICS and administer and monitor one or more CSs.

The Diagnostics Component of the IM supports on-the-fly diagnostics gathering, computing, and/or compiling of pre-specified diagnostics information or parameters from the MSERV. In this manner the CS may provide diagnostics information and a user may provide dynamically updateable diagnostics information.

The RTC translates communications between components of the CS and components of the MSERV. As an example the RTC may be used to retrieve user information from the directory service (e.g., Active Directory) of a groupware application in response to a request from the CS, as described below. Communications between the RTC and components of the CS use for example XML and Web Services. Communications between the RTC and the MSERV may use one or more APIs of the MSERV (e.g., MAPI, Collaboration Data Objects ("CDO"), Web Distributed Authoring and Versioning ("WebDAV"), etc.).

The MSERV of an embodiment represents a messaging and collaboration server. The messaging and collaboration server includes a groupware application that runs on one or more servers and enables users via local client devices to send and/or receive electronic mail and other forms of interactive communication through computer networks. The CS of an embodiment interoperates with groupware applications that include, but are not limited to, Microsoft Exchange Server, but alternative embodiments may use other types of messaging and collaboration servers. Therefore, the CS of an embodiment interoperates with client device applications ("client applications") such as Microsoft Outlook, as well as with other email client applications (e.g., Microsoft Outlook Express).

The MSERV sends and receives email messages through what is commonly referred to as a client device such as a personal computer, workstation, or a mobile device including mobile phones or PDAs. The client device typically connects to the LAN, which may include any number and/or combination of servers or mainframe computers where the email mailboxes and public folders are stored. The centralized servers connect to numerous other types of networks (e.g., private or proprietary, and the Internet) to transmit email messages to and receive email messages from other email users. Consequently, the CS uses the MSERV for storing and forwarding email messages in an embodiment.

The MSERV also couples to a directory service (not shown), which is a database of information on each user account in the enterprise network system. Access to the directory service may use for example a Lightweight Directory Access Protocol ("LDAP").

With regard to client device access functionality, the MSERV provides integrated collaborative messaging features such as scheduling, contact, and task management capabilities. As an example MSERV configuration, when the MSERV is Microsoft Exchange, the MSERV runs on a version of the Microsoft Windows Server operating system. A version of Microsoft Office Outlook runs on Windows-based local client devices and communicates with the MSERV through the messaging application programming interface ("MAPI") protocol. The MSERV also accommodates other client device access by supporting one or more of Post Office Protocol 3 ("POP3") and Internet Message Access Protocol 4 ("IMAP4") protocols as well as support for Simple Mail Transfer Protocol ("SMTP"). Using this same MSERV configuration example, the CS of an embodiment, along with Microsoft Outlook Web Access (a service in Microsoft Exchange) accommodates web browser-based access clients, also referred to as thin clients.

The MSERV collaboration features support information sharing among users. Collaborative scenarios include maintaining shared address lists that all users can view and edit, scheduling meetings that include people and conference rooms by viewing associated free or busy schedules, the ability to grant other people, such as administrators, access to user mailboxes on behalf of the user.

As described above, the IM serves as an interface for the transfer of information between components of the CS and components of the MSERV. Transferring information includes for example pulling, receiving, retrieving, polling, transmitting, and pushing operations, to name a few. As an example of information transfers between the CS and the MSERV, the IM pulls information from one or more components of the MSERV and makes the pulled information available to, for example, the CS Cache. The IM also pushes information from one or more components of the CS to the MSERV.

In serving as an interface between the CS and the MSERV, the components of the IM (e.g., RTC) translate communications between components of the CS (e.g., Virtual Machine, Cache, etc.) and components of the MSERV environment. As an example the IM retrieves user information from components of the directory service (e.g., Active Directory) in response to a request from the CS/Cache.

Embodiments of the IM may include one or more of the following components: an RTC, a Management Console, a desktop component, messaging actions control component, Diagnostics Component and/or a message waiting indication component. The desktop component allows the user to configure aspects of the user's integrated messaging account, such as voice message greetings, extended absence greeting, PIN code data, and presence information. In an embodiment, the desktop component allows the user to configure behavior of the F/T module. For example, filtering and transcription may be turned off for all voicemail messages. As another example, refined transcription is automatically requested for voicemail messages from certain callers. Many other behaviors are possible based on all of the Cache information available within the system 1100.

The messaging actions control component receives and responds to user generated requests from a form-based user interface ("FBUI") to take actions such as playing, replaying to and forwarding voice messages, requesting a refined transcription, calling the sender of a voicemail message, and more. The message waiting indication component receives events from the user's message inbox folder and requests corresponding action from the PBX or other aspect of the telephony system, such turning on message waiting indicators on the user's device(s). The message waiting indication component may send notifications by way of SMS, MMS and/or pager.

Figure 12:
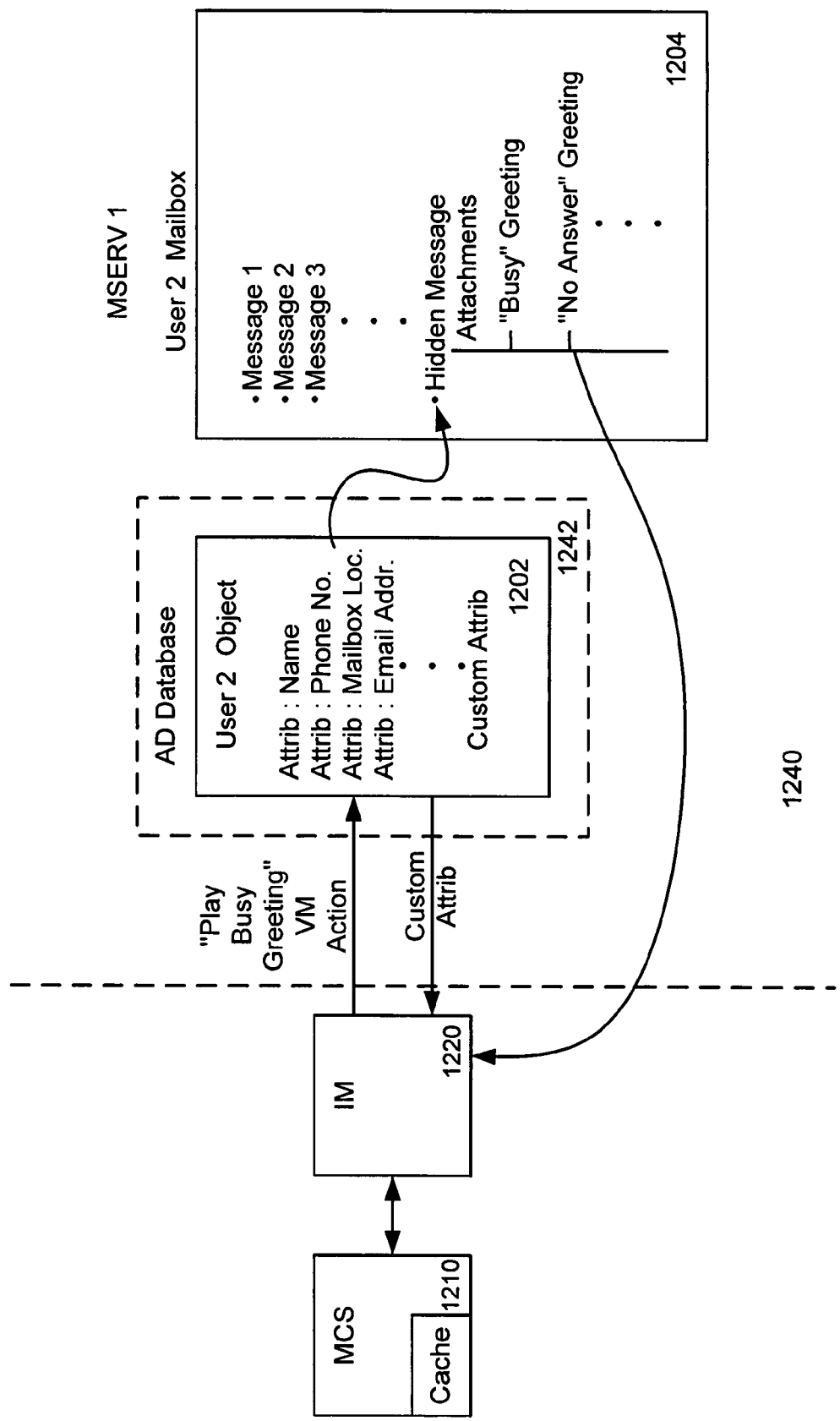
FIG. 12 is a block diagram that shows interactions between an interface module ("IM") and components of a messaging server ("MSERV") environment, under an embodiment.

FIG. 12 is a block diagram that shows interactions between an interface module ("IM") 1220 and components of a messaging server ("MSERV") environment 1240, under an embodiment. The components of MSERV environment 1240 include the MSERV and one or more Databases as described above. The Database of an embodiment includes a directory service 1242.

Directory service 1242 provides a location for storage of information about network-based entities, such as applications, files, and printers to name a few. Directory service 1242 also stores information about individuals, also referred to as users, and this information is referred to herein as "User Information." As such directory service 1242 provides a consistent way to name, describe, locate, access, manage, and secure information about individual resources in an enterprise network environment. Directory service 1242 uses the stored information to act as the main switchboard of the enterprise network operating system and is therefore the central authority that manages the identities and brokers the relationships between distributed resources of the enterprise network, thus enabling the resources to work together. Directory service 1242 of an embodiment may be Microsoft Active Directory ("AD"), but is not so limited.

In embodiments including AD, there is a user object stored in an AD Database for each enterprise user. For example, the user object for enterprise USER 2 is shown as USER 2 object 1202. The user object includes many fixed attributes such as user name, user phone number, user mailbox location, and user email address.

The user object further includes a number of "Custom Attributes." The number of Custom Attributes is small, for example fifteen, compared to the number of fixed attributes. The Custom Attributes are usable to store information not provided for in the predefined fixed attributes. In one embodiment, a Custom Attribute stores user-specific data that is used by the F/T module and Voice Applications. Examples of such user-specific data include a user-specific word list, and user preferences regarding the behavior of the F/T module. Further examples of user-specific data include a class of service ("COS") for the user, a voicemail extension for the user, whether voicemail is enabled for the user, etc. The data is stored as a data stream in the Custom Attribute with a maximum size of 2048 bytes. In an alternative embodiment, the user-specific data that is used by the F/T module and Voice Applications is stored as individual data items in fixed attributes by extending AD in a known manner.

The user mailbox location fixed attribute indicates where the user's email mailbox is stored in the enterprise. In some large enterprises, there may be many MSERVs, each including a database storing many user mailboxes. As shown, the mailbox location fixed attribute points to USER 2 mailbox 1204 on an MSERV called MSERV 1.

User mailbox 1204 stores email messages sent to the user, as well as outgoing messages and other items, for predetermined periods of time. In an embodiment, the messages can be of at least two types, one of which is a "normal" message that is routinely accessible by the user. Another message type is a "hidden" message that is not routinely accessible by the user through the normal user email interfaces. In an embodiment, a hidden message is used to store data used by the F/T module and Voice Applications. In contrast to the data stored in the Custom Attribute, however, the data stored in the hidden message can be much larger than the 2048 byte limit of the custom attribute. In one embodiment, among the data stored in the hidden message are audio files stored as attachments to the hidden message, such as a "busy" greeting for the user's voicemail mailbox, a "no answer" greeting for the user's voicemail mailbox, and a recorded name for the user's voicemail mailbox.

An example of the CS accessing the MSERV environment 1240 through IM 1220 is a phone caller calling the voicemail mailbox of USER 2 when USER 2 is on the phone. The CS transmits an action via IM 1220 with a request to "play busy greeting." The transmission includes information to access the USER 2 object 1202 fixed attributes to determine the user's email mailbox location. In addition the transmission includes information to access the USER 2 object 1202 Custom Attribute and to transfer the contents of the Custom Attribute to the CS via IM 1220. When the user's email mailbox is accessed, the hidden message is opened to transfer the appropriate audio file ("busy" greeting in this case) to the CS for playing over the phone to the caller. In many cases, it may not be necessary to transfer either the Custom Attribute or the audio file from the MSERV environment 1240 because the current custom attributes and audio file are cached on the CS.

As described above, operations of the Voice Applications and the Virtual Machine couple the Cache and other components of the CS to components of the MSERV via the IM. As such, the CS and the IM support the transfer of information between the Cache and backend network components like the MSERV and the database. This configuration provides transparency between the Voice Applications and data stored in the database when using information of the database to support voicemail messaging functions of the CS, as described below.

The information transfers between the Cache and the MSERV along with use of the Custom Attributes and Hidden Messages as described above allow the ICS to overcome the need for an external database to store information stored by a typical voicemail system. This is because the information used by the CS in providing voicemail message capabilities integrated with the email messaging capabilities of the enterprise network is pulled by the CS from the MSERV via the IM. The pulling or retrieving may be performed periodically, continually, on demand, and/or in response to particular events (e.g., update of the information in the MSERV) but is not so limited. The information pulled by the CS includes information of a "Global Address List" ("GAL"), information of one or more "Public Folders," "Personal Contacts," and information of a "User List."

The GAL includes information of all users in the enterprise network having access privileges that include the use of email. Public Folders include information of the network enterprise (e.g., contacts, calendars, etc.) that are shared with all users. The Personal Contacts include contact information for each user.

The User List includes User Information for a subset of users in the GAL each of whom has access privileged that include the use of the ICS. The User List therefore is a subset of the GAL and is retrieved and/or cached as a separate list or stream in order to improve efficiency of communications and minimize the delays associated with having the CS search the entire contents of the GAL for information used in executing a user-requested action on a voicemail message. The User List of an embodiment includes one more of the following parameters corresponding to each user, but is not limited to these parameters: Site identification, mail box number, pronounceable name, office telephone extension, COS, automatic attendant state (e.g., enabled, disabled), voicemail state (e.g., enabled, disabled), Voice User Interface ("VUI") state (e.g., enabled, disabled), mobile access state (e.g., enabled, disabled), bad logins, locked out, attendant destination, force change of PIN code, mobile gateway identification, full name, first name, last name, user name, home telephone number, office telephone number, cellular telephone number, identification, email address, department, active greeting state, time and date announcement, voicemail notification state (e.g., enabled, disabled), mail box status, PIN code in encrypted or raw form, no answer greeting, busy greeting, extended absence greeting, recorded name, and system greeting.

Instead of storing the information pulled from the MSERV in a separate voicemail database as would be done in a typical voicemail system, the pulled information is pushed by the IM to the CS and held in the Cache. The CS uses the pulled information in subsequent voicemail message manipulation operations as described below. This pulling and caching of information by the CS improves the speed and efficiency of voicemail message operations and prevents unnecessary loads on the MSERV resulting from the nearly continuous stream of read requests to the MSERV database in typical messaging systems.

The pulling of information from the MSERV by the CS includes pulling and caching of information including the GAL, Public Folder, and User List. The pulled information is cached by the CS on a system or non-individual basis because this information applies throughout the enterprise. This information is pulled and cached periodically, for example at 24-hour intervals (e.g., each morning at 2:00 am), or may be loaded on demand, but is not so limited.

In contrast the CS pulls and caches information of the Personal Contacts on a per user basis because this information is different for each user. The Personal Contacts may be requested and cached by the CS periodically or on demand (e.g., at the time a user logs in to the ICS, in response to modifications of the Personal Contacts, etc.).

In operating to provide integrated messaging capabilities, the CS and the IM function to route a call placed by a caller to a user and, in the event the user is not available, to receive and route a voicemail message left by the caller. The CS and the IM also function to provide a user with access to voicemail messages using the messaging server of the enterprise email system. The voicemail access supports both online and offline modes of the messaging server.

An example of call routing by the CS, and with further reference to FIG. 11, the CS receives and detects a call at the Telephony Interface. Data of the call (e.g., called party information, calling party information, reason for call transfer, etc.) invokes the Voice Browser. The Voice Browser transfers a request to the Voice Applications in response to the call data.

A Dispatcher component of the Voice Applications routes the call to one or more other Voice Application components in accordance with information of the User List. As an example, the Dispatcher identifies the target user for the call, and determines whether the target user's automatic attendant is enabled. If the automatic attendant is enabled then the automatic attendant receives the call request and provides the caller with one or more call routing options (e.g., caller selects call routing by selecting and/or saying extension number, selecting and/or saying name, etc.) and routes the call according to the caller's input.

As an example, one or more of the Voice Applications determine an active greeting currently designated by the user for use in responding to calls (e.g., system greeting, no answer greeting, busy greeting, extended absence greeting, etc.), and retrieve the designated active greeting from one of the Cache or MSERV as appropriate to a state of the MSERV. The respective application(s) play the greeting, activate a "record mode" to record the voicemail message of the caller, and provide the caller with additional options available for call and/or message routing (e.g., message marking options, message delivery options, send message, route message to additional users, etc.). Upon completion of the recording and/or selection of a message routing option by the caller, the respective application(s) terminate the call (hangs up) and transfer the recorded voicemail message to the F/T module and to one or more locations in the Cache and/or MSERV (e.g., a mail box) that correspond to the user. Alternatively, the voicemail message may be transferred before the application terminates the call.

Figure 13:
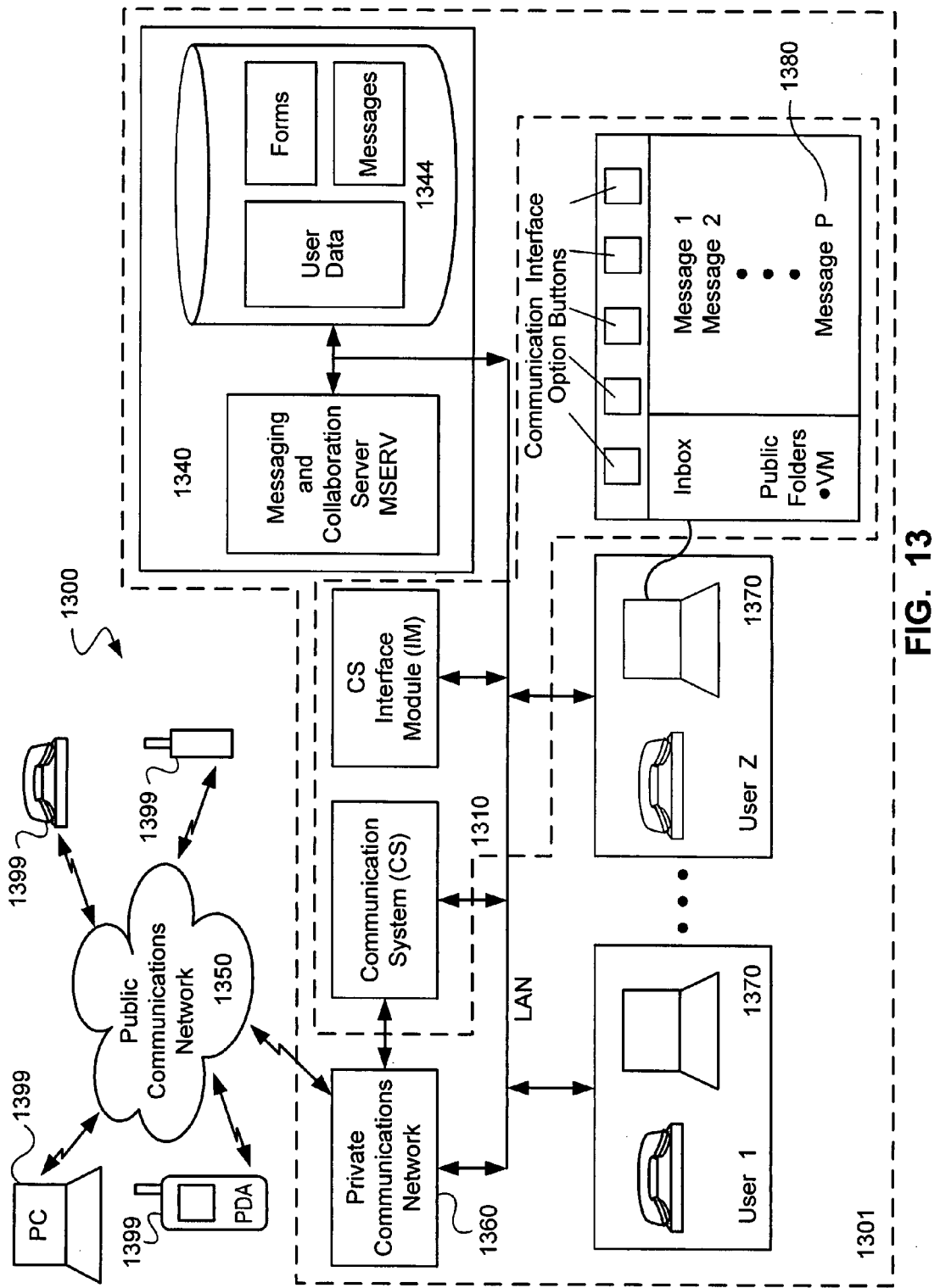
FIG. 13 is a block diagram of a system that includes an integrated communication system ("ICS") with a Form-Based User Interface ("FBUI"), under an embodiment.

FIG. 13 is a block diagram of a system 1300 that includes an integrated communication system ("ICS") 1310 with a Form-Based User Interface ("FBUI"), under an embodiment. As previously described herein, a user's voicemail can be roughly transcribed, and the rough transcription with an audio file of the voicemail sent to the user's email-capable device as a "normal" email with one or more attachments.

As further described below, a FBUI is an alternative mechanism for delivering the rough transcription and voicemail audio file via an email system. System 1300 includes a networked environment 1301 that provides integrated voicemail and email messaging through the use of ICS 1310. Networked environment 1301 includes a LAN that couples to components of ICS networked environment 1301 and a messaging server environment 1340. ICS 1310 includes CS 1310, IM 1320, and FBUI 1380, but is not so limited. FBUI 1380 is further presented to a user (e.g., USER Z) via one or more processor-based devices 1399 devices, such as PDA 1399.

Messaging server environment 1340 includes the MSERV and a Database 1344, but is not so limited. The LAN couples to any number of other networks 1350 and 1360 using any of a variety of communication protocols, where the networks 1350 and 1360 may be of the same or of different types. As an example, the networks may include a public communications network 1350 and a private communications network 1360. Private communications network 1360 may be a PBX coupled to the LAN of the enterprise network, for example. Networks 1350 and 1360 allow for information transfers between client devices 1370 that are local to networked environment 1301 and client devices 1399 that are external to networked environment 1301. The client devices may alternatively be referred to as "user devices" 1370 and 1399.

In an embodiment in which networked environment 1301 is an enterprise network, ICS 1310 replaces the voicemail server typically found in enterprise networks with at least one CS 1310, but embodiments are not so limited. CS 1310 is coupled to the private communications network (e.g., PBX) of each network enterprise. While one CS is shown in this example system 1300, the enterprise network may include multiple CSs 1310 coupled to enterprise network in an "N+1" configuration, where "N" is any number 1, 2 ... X.

For security reasons, communication to and from the CS is restricted in an embodiment. The CS communicates with the IM servers, the private communications network, other CSs and selected client devices. According to an embodiment of the invention, communications with the CS may be restricted to network components having particular known addresses. Additionally or alternatively, communications with the CS may require authentication by passcode or other security measures for certain kinds of access, for example, for access by the administrator. Security may also or alternatively be encrypted and/or provided by requiring a physical connection between the CS and other component, such as in the case of a connection between a CS and a private communications network through a direct cable connection. Restricted communication to and from the CS provides confidentiality of voicemails and voicemail transcriptions as described herein.

The CS via the FBUI generally provides a form to a client device from a first server (e.g., messaging server, MSERV, etc.) via a network connection. The form includes data or code that when executed by the receiving client device results in presentation of a FBUI on a display of the client device. The FBUI includes a number of buttons or icons that allow a user to select an action on an item via a second server (e.g., communication server, CS, etc.), where the item is stored on the first and/or second servers, and the first and second servers are different servers. The FBUI of an embodiment uses a web browser embedded in the form as the means for coupling and/or communicating with a corresponding browser control of the second server. Communications between the client device and the second server thus avoid security and/or other network policy issues that would prohibit the client device from communicating with the second server via the network coupling between the client device and the first server.

As described above, the FBUI operates as a form-based messaging interface to transfer a first message (e.g., voicemail message) to a messaging server (e.g., MSERV) from a communication server (e.g., CS) via a first coupling (e.g., IM). The messaging server generates a second message (e.g., email message) in response to a type of the first message and transfers the second message to a client device via a second coupling (e.g., LAN). The type of the first message is specified by the communication server using properties on the message that identify the message as a "Voicemail Type" ("VMT") message. The second message is of a different type and includes data of the first message, but is not so limited. The communication server also transfers to the client device form data that corresponds to the first message. The client device uses the form data to establish a third coupling (e.g., browser link) between the client device and the communication server. The user may direct actions on the first message from the client device via the third coupling using the form data.

The ICS of an embodiment provides the FBUI 1380 to a user via his/her local or external client device. The FBUI is provided to the client device through the use of a FBUI Form, where the structure of the FBUI Form conforms to the message structure of the messaging server environment. For example, when the messaging server environment includes the use of Microsoft Exchange and Microsoft Outlook, the FBUI Form is generated to comply with Microsoft formats as appropriate to Exchange and Outlook.

Information for generation of the FBUI Form is provided to the messaging server environment by the CS via the IM, and the code used for FBUI Form generation is hosted by the MSERV in an embodiment. The FBUI Form of an embodiment includes code that generates information of the FBUI display as well as the buttons of the display. The FBUI Form further includes an embedded browser control for use in establishing communications between the client device displaying the FBUI Form and a web server (e.g., CS, IM, other server) for example. The embedded browser control therefore allows the host client device to couple and communicate with a server that is different from the MSERV via a communication channel that is outside the enterprise network LAN. Thus, the FBUI Form enables a communication channel between the local client device currently executing the form and a component like the CS and/or IM in spite of network policy issues that otherwise might prohibit the client device from communicating outside the enterprise network message infrastructure.

Using the FBUI, a user can access/view and take a variety of actions on his/her voicemail messages within an email framework of the host enterprise network system. As an example, when the CS of an embodiment receives a voicemail message it transfers the voicemail message to the MSERV, as described above. In transferring the voicemail message to the MSERV, the CS specifies properties on the message that identify the message as a "Voicemail Type" ("VMT") message. The message is received and stored by the MSERV as a VMT message using the same storage and retrieval structure as used with other message types like email messages.

At such time as a user wishes to access his/her messages via his/her client device, the active message browser of the client device receives the VMT message along with any other mail messages currently stored in his/her electronic mail box. The message browser corresponds to the message structure of the messaging server environment (e.g., Outlook in a Microsoft environment). Upon receipt of the message, the message browser identifies the message as a VMT message. As the code that implements the FBUI Form is stored on the MSERV, implementation of the functionality and/or features associated with the FBUI Form uses communication between the user's client device and the MSERV via the LAN. For example, the client device message browser requests the FBUI Form from the MSERV in response to identifying a message as a VMT message because this is the form that corresponds to the VMT message type. The MSERV transfers the FBUI Form to the requesting client device, and the client device message browser launches the form in response to the user selecting a VMT message for viewing.

Figure 14:
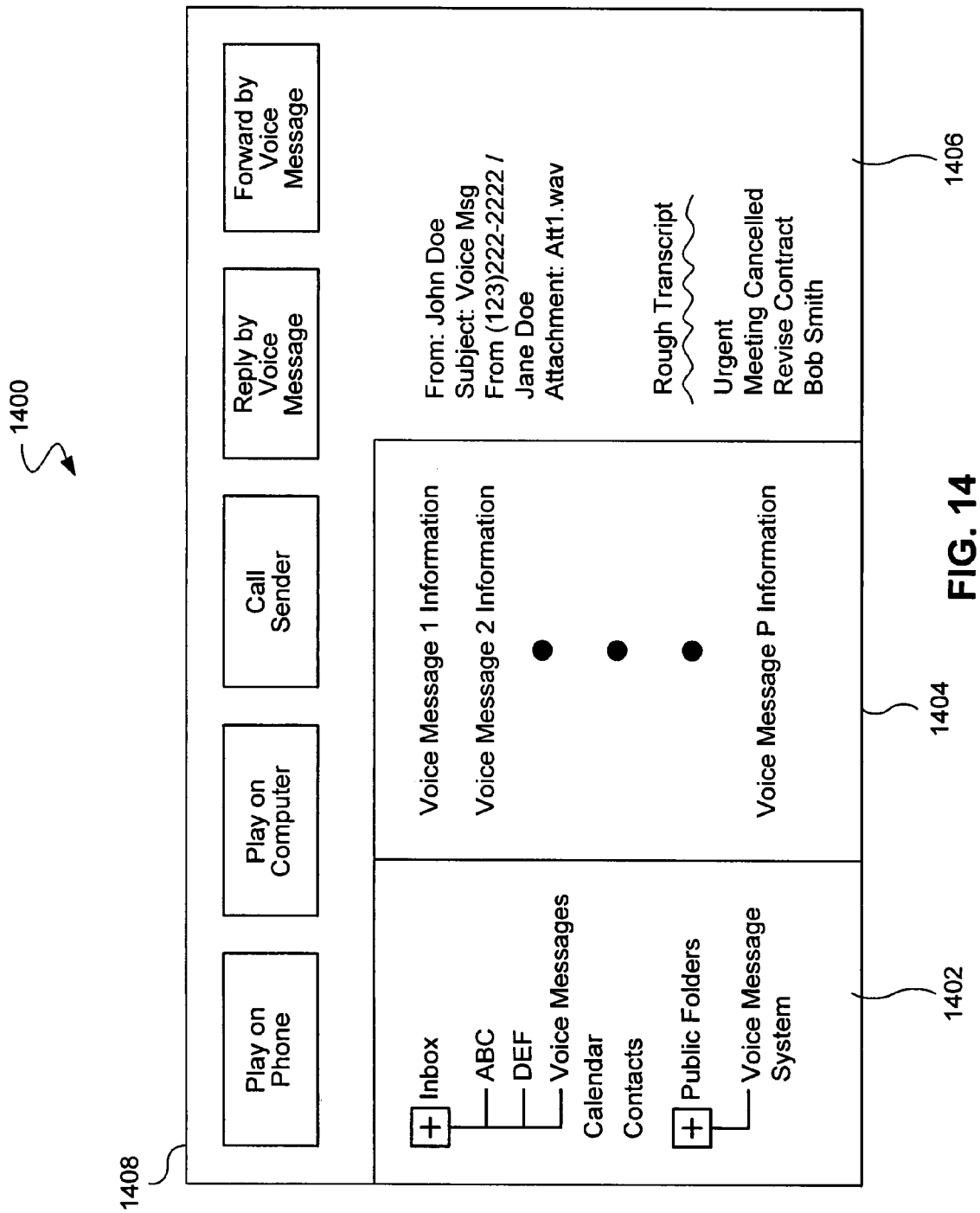
FIG. 14 is a sample FBUI as displayed on a client device, under an embodiment.

The message browser uses data or code of the FBUI Form to display the FBUI on the user's client device. FIG. 14 is a sample FBUI 1400 as displayed on a client device, under an embodiment. The FBUI 1400 includes three areas 1402, 1404, and 1406 that present information to a user. The areas include a folder area 1402, a contents area 1404, and a function/information area 1406, but are not limited to these areas as the UIs of alternative embodiments may present any number and/or type of areas. In alternative embodiments, all three areas 1402-1406 may be presented at the same time, as shown in FBUI 1400, or various subsets of the three areas may be presented at the same time in various combinations.

Folder area 1402 presents one or more folders to which the user has access via the FBUI 1400 and the client device. The "INBOX" may contain a list of voicemail messages in the same listing as other messages, including email messages. Alternatively, the Inbox may include a subfolder ("VOICE MESSAGES") which includes the voicemail messages, and selection of this folder results in the presentation of voicemail messages of the user's mail box in the contents area 1404.

The contents area 1404 generally presents the contents of the folder selected using the folder area 1402. As an example, the contents area 1404 presents information corresponding to any number of voicemail messages in the user's mail box when the INBOX or VOICE MESSAGES folder is selected. Contents area 1404 allows the user to select a particular voicemail message by placing a cursor on "VOICE MESSAGE 1 INFORMATION" for example. By (double) clicking a message in the contents area 1404 or otherwise indicating to the message browser to display a voice message, function/information area 1406 is displayed.

Function/information area 1406 of FBUI 1400 presents a rough transcription as shown. Function/information area 1406 further presents one or more "voicemail action buttons" 1408 (also referred to herein as "buttons") each of which represents an action the user may select for a voicemail message. In this example, the VOICE MESSAGES folder is selected, and selection of a message in contents area 1404 allows the user to take an action on the selected message using the buttons shown. Placing the cursor of contents area 1404 on a particular message and choosing an action on the selected message with a button therefore invokes operations on the message via components of the ICS (e.g., CS, Cache, IM). The buttons of an embodiment include a "Play on Phone" button, a "Get Refined Transcript" button, a "Call Sender" button, a "Reply by Voicemail" button, and a "Forward by Voicemail" button, but the embodiment is not limited to this same number of buttons or to buttons offering the same functionality.

In other embodiments, presentation of areas or information of the FBUI may vary in many ways. For example, in one embodiment, the action buttons appear after the user has selected (for example by double clicking a particular voice message from the contents area 1404). The action buttons may also appear when the user right clicks on a particular voice message in the contents area 1404.

The folder area 1402 may also include a subfolder ("VOICE MESSAGE SYSTEM") under the Public Folder. As such, the VOICE MESSAGE SYSTEM folder may not be considered an actual folder but instead a uniform resource locator ("URL") that, when selected, sends an HTTP request to a web server and launches/displays an ICS browser inside the client device message browser. The web server may, for example, be a component of the CS and/or IM, but is not so limited. The ICS browser is an embedded or hidden browser that displays function/information area 1406 in the area of the client device message browser where emails would typically appear, and the voicemail messages are displayed in function/information area 1406.

As an example, function/information area 1406 is displayed in the contents area 1404 of an embodiment. Function/information area 1406 may be served from the IM and may contain any information related to the voice messaging system that is user specific. In one embodiment, function/information area 1406 displays a user login prompt where the user enters the user name and PIN code. Subsequently, the system displays the user's configuration date, such as PIN code, attendant extension, greeting type, and other applicable information.

The hidden browser enables an HTTP link and communications with the IM, for example, which then brokers communications (via HTTP) with the CS via the CS Web Server for example. Therefore, while typical messaging servers and LANs use security policies that restrict the use of "special" code in form data, use of the hidden browser embedded in a form structure that is native to the host system overcomes this restriction because the browser is not detected or considered as special code. Use of the hidden browser thus supports communication with the corresponding browser control in the CS and/or the IM, thereby allowing the integration of voicemail messaging provided by the CS with the email messaging system of the enterprise network A "voicemail message" in the ICS is generally any message created using a client device generating an audio stream. A "voicemail message" is also any voice type message, such as a message created using the "Reply by Voice Message" and "Forward by Voice Message" buttons of the FBUI. An "email" is any message created using buttons of a host mail message system that function to generate a reply message or to forward a message in response to receipt of a message, even if replying or forwarding a voicemail message. The ICS of an embodiment presents a voicemail message to a user in an email message system using the FBUI as the presentation form.

The components of the ICS described above include any collection of computing components and devices operating together. The components of the ICS can also be components or subsystems within a larger computer system or network. The ICS components can also be coupled among any number of components (not shown), for example other buses, controllers, memory devices, and data input/output (I/O) devices, in any number of combinations. Further, components of the ICS can be distributed among any number/combination of other processor-based components. Further details of a system including an ICS and an FBUI and suitable for embodying the invention claimed herein is described in U.S. patent application Ser. No. 11/053,271, filed Feb. 7, 2005, and titled "Integrated Multi-Media Communication System", which is incorporated herein by reference.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the F/T module are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. An integrated messaging system, comprising:
a messaging server coupled to at least one network; and
an integrated communication server in communication with networks of different types, and further in communication with the messaging server, the integrated communication server comprising a filter/transcribe module, the filter/transcribe module configured to:
receive a voicemail message from a first network;
perform a filtering operation on the voicemail message from a caller to a user comprising searching for predetermined words;
perform a rough transcription of the voicemail message;
generate an email message containing the rough transcription;
receive a request from the user to provide a refined transcription of the voicemail message;
request the refined transcription to be performed, wherein requesting comprises sending an audio file of the voice message, via one of the networks, to an entity to perform the refined transcription.

2. The integrated messaging system of claim 1, wherein the filter/transcribe module is further configured to send the refined transcription to the user as a new email message.

3. The integrated messaging system of claim 2, wherein the filter/transcribe module is further configured to send the email message to at least one user device.

4. The integrated messaging server of claim 3, wherein the generated email further contains an audio file of the voicemail message.

5. The integrated messaging system of claim 1, wherein the filter/transcribe module is further configured to filter the voicemail message, wherein filtering comprises searching for predetermined words.

6. The integrated messaging system of claim 5, wherein the filter/transcribe module is further configured to generate an email priority flag based on the filtering.

7. The integrated messaging system of claim 6, wherein the filter/transcribe module is further configured to generate an email message containing the rough transcription and the priority flag.

8. The integrated messaging system of claim 7, wherein the filter/transcribe module is further configured to generate an email message containing the rough transcription, the audio file, and the priority flag.

9. The integrated messaging system of claim 7, wherein the filter/transcribe module is further configured to send the email message to at least one user device.

10. The integrated messaging system of claim 1, wherein the entity is a third party not associated with the integrated communication server.

11. The integrated messaging system of claim 1, wherein the rough transcription transcribes a portion of the voice message.

12. The integrated messaging system of claim 1, wherein the filter/transcribe module is further configured to receive the refined transcription from the entity; and substitute the refined transcription for the rough transcription in the email.

13. The integrated messaging system of claim 12, wherein the filter/transcribe module is further configured to reset a status of the email to be "unread".

14. The integrated messaging system of claim 1, wherein the messaging server and the integrated communication server are coupled via a WAN.

15. The integrated messaging system of claim 1, wherein the messaging server and the integrated communication server are coupled via the Internet.

16. The integrated messaging system of claim 1, wherein the messaging server and the integrated communication server are coupled via a LAN in an enterprise.

17. The integrated messaging system of claim 16, wherein the integrated communication server further comprises an interface module configured to interface with the messaging server.

18. The integrated messaging system of claim 17, wherein the messaging server hosts an enterprise groupware application.

19. The integrated messaging system of claim 18, wherein the groupware application comprises a directory service that includes user information for members of the enterprise.

20. The integrated messaging system of claim 19, wherein the filter/transcribe module is further configured to perform filtering using the user information.

21. An integrated communication system, comprising:
a communication server that couples among networks of different types, the communication server configured to receive audio data via a first network, wherein the audio data comprises a voicemail message sent to a user of the communication server configured to transform the audio data to text, the communication server comprising:
a memory;
a processor in communication with the memory, the processor operable to execute a filter/transcribe module, the filter/transcribe module configured to:
perform a filtering operation on the voicemail message from a caller to a user comprising searching for predetermined words;
perform a rough transcription of the voicemail message;
generate an email message to the user containing the rough transcription;
receive a request to provide a refined transcription of the voicemail message;
request the refined transcription to be performed, wherein requesting comprises sending an audio file of the voicemail message, via one of the networks, to an entity to perform the refined transcription; and
an interface module that couples to the communication server, wherein the interface module pulls a plurality of user information from a messaging server of a network, wherein the user information includes information relevant to at least the network.

22. The system of claim 21, wherein performing a filtering operation includes comparing words in the audio data to one or more items of the plurality of user information.

23. The system of claim 22, wherein the filter/transcribe module is further configured to cause a refined transcription of the audio data to be performed based on predetermined preferences that indicate the refined transcription is to be performed automatically.

24. A multi-media communication method, comprising:
receiving a voicemail message from a first network;
performing a filtering operation on the voicemail message from a caller to a user comprising searching for predetermined words;
performing a rough transcription of the voicemail message;
generating an email message containing the rough transcription;
refining the rough transcription of the voicemail message into a refined transcription; and
requesting the refined transcription to be performed, wherein requesting comprises sending an audio file of the voicemail message, via one of the networks, to an entity to perform the refined transcription.

25. The method of claim 24, further comprising:
receiving the refined transcription from the entity;
substituting the refined transcription for the rough transcription in the email; and
resetting a status of the email to be "unread".

26. The method of claim 25, wherein the refined transcription of the audio data is performed based on at least one of a user request and predetermined preferences that indicate the refined transcription is to be performed automatically.

* * * * *